United States Patent
McRaven et al.

(10) Patent No.: US 12,353,678 B2
(45) Date of Patent: Jul. 8, 2025

(54) OBJECT-CENTRIC DATA ANALYSIS SYSTEM AND ASSOCIATED GRAPHICAL USER INTERFACES

(71) Applicant: Palantir Technologies Inc., Denver, CO (US)

(72) Inventors: John McRaven, New York, NY (US);
Francis Chen, New York, NY (US);
Shuyang Li, New York, NY (US);
Spencer Tank, Brooklyn, NY (US);
Xavier Falco, London (GB)

(73) Assignee: Palantir Technologies Inc., Denver, CO (US)

( * ) Notice: Subject to any disclaimer, the term of this patent is extended or adjusted under 35 U.S.C. 154(b) by 480 days.

(21) Appl. No.: 17/031,707

(22) Filed: Sep. 24, 2020

(65) Prior Publication Data

US 2021/0117051 A1 Apr. 22, 2021

Related U.S. Application Data

(60) Provisional application No. 62/916,444, filed on Oct. 17, 2019.

(51) Int. Cl.
*G06F 3/0482* (2013.01)
*G06F 16/242* (2019.01)
(Continued)

(52) U.S. Cl.
CPC .......... *G06F 3/0482* (2013.01); *G06F 16/248* (2019.01); *G06T 11/206* (2013.01)

(58) Field of Classification Search
CPC .............. G06F 3/0482; G06F 16/248; G06F 16/2428; G06F 16/26; G06F 40/186; G06T 11/206

See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| CN | 102546446 | 7/2012 |
| CN | 103167093 | 6/2013 |

(Continued)

OTHER PUBLICATIONS

U.S. Appl. No. 15/784,004, Interactive User Interface For Dynamically Updating Data and Data Analysis and Query Processing, filed Oct. 13, 2017.

(Continued)

*Primary Examiner* — Mustafa A Amin
(74) *Attorney, Agent, or Firm* — Knobbe, Martens, Olson & Bear, LLP

(57) ABSTRACT

Methods and systems for generating and analyzing visualizations based on a group of sets of data objects. One system includes processors executing instructions to present the sets of data objects in a selectable format on a display device, receive a user selection of a first set of data objects, generate a user interface comprising an indication of the first set of data objects and a plurality of selectable tools to generate a first data visualization of the first set of objects from one or more operations to the first set of objects, receive a user selection of a second set of data objects, receive a user selection to cause the application of the one or more operations to the second set of data objects, and update the user interface to comprise a second visualization based on the one or more operations performed on the second set of data objects.

17 Claims, 10 Drawing Sheets

(51) Int. Cl.
*G06F 16/248* (2019.01)
*G06F 16/26* (2019.01)
*G06T 11/20* (2006.01)

(56) References Cited

U.S. PATENT DOCUMENTS

| | | | |
|---|---|---|---|
| 5,414,809 A | 5/1995 | Hogan et al. | |
| 5,515,488 A | 5/1996 | Hoppe et al. | |
| 5,632,009 A | 5/1997 | Rao et al. | |
| 5,670,987 A | 9/1997 | Doi et al. | |
| 5,724,033 A | 3/1998 | Burrows | |
| 5,745,894 A | 4/1998 | Burrows et al. | |
| 5,781,704 A | 7/1998 | Rossmo | |
| 5,798,769 A | 8/1998 | Chiu et al. | |
| 5,845,300 A | 12/1998 | Comer | |
| 5,870,559 A | 2/1999 | Leshem et al. | |
| 6,057,757 A | 5/2000 | Arrowsmith et al. | |
| 6,088,032 A | 7/2000 | Mackinlay | |
| 6,091,956 A | 7/2000 | Hollenberg | |
| 6,144,962 A | 11/2000 | Weinberg et al. | |
| 6,161,098 A | 12/2000 | Wallman | |
| 6,178,382 B1 | 1/2001 | Roederer et al. | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,430,305 B1 | 8/2002 | Decker | |
| 6,456,997 B1 | 9/2002 | Shukla | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,674,434 B1 | 1/2004 | Chojnacki et al. | |
| 6,714,936 B1 | 3/2004 | Nevin, III | |
| 6,775,675 B1 | 8/2004 | Nwabueze et al. | |
| 6,820,135 B1 | 11/2004 | Dingman | |
| 6,828,920 B2 | 12/2004 | Owen et al. | |
| 6,839,745 B1 | 1/2005 | Dingari et al. | |
| 6,877,137 B1 | 4/2005 | Rivette et al. | |
| 6,900,807 B1 | 5/2005 | Liongosari et al. | |
| 6,976,210 B1 | 12/2005 | Silva et al. | |
| 6,978,419 B1 | 12/2005 | Kantrowitz | |
| 6,980,984 B1 | 12/2005 | Huffman et al. | |
| 6,985,950 B1 | 1/2006 | Hanson et al. | |
| 7,020,847 B1 | 3/2006 | Holzheuer | |
| 7,036,085 B2 | 4/2006 | Barros | |
| 7,043,702 B2 | 5/2006 | Chi et al. | |
| 7,055,110 B2 | 5/2006 | Kupka et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witkowski | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,426,654 B2 | 9/2008 | Adams et al. | |
| 7,454,466 B2 | 11/2008 | Bellotti et al. | |
| 7,461,077 B1 | 12/2008 | Greenwood | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,525,422 B2 | 4/2009 | Bishop et al. | |
| 7,529,727 B2 | 5/2009 | Arning et al. | |
| 7,529,734 B2 | 5/2009 | Dirisala | |
| 7,558,677 B2 | 6/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,185 B2 | 11/2009 | Werner et al. | |
| 7,617,232 B2 | 11/2009 | Gabbert et al. | |
| 7,620,628 B2 | 11/2009 | Kapur et al. | |
| 7,624,122 B2 | 11/2009 | Gaurav et al. | |
| 7,627,812 B2 | 12/2009 | Chamberlain et al. | |
| 7,634,717 B2 | 12/2009 | Chamberlain et al. | |
| 7,703,021 B1 | 4/2010 | Flam | |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,756,843 B1 | 7/2010 | Palmer | |
| 7,770,100 B2 | 8/2010 | Chamberlain et al. | |
| 7,788,064 B1 * | 8/2010 | Hao | G06F 16/283 |
| | | | 702/179 |
| 7,805,457 B1 | 9/2010 | Viola et al. | |
| 7,809,703 B2 | 10/2010 | Balabhadrapatruni et al. | |
| 7,818,291 B2 | 10/2010 | Ferguson et al. | |
| 7,818,658 B2 | 10/2010 | Chen | |
| 7,870,493 B2 | 1/2011 | Pall et al. | |
| 7,894,984 B2 | 2/2011 | Rasmussen et al. | |
| 7,899,611 B2 | 3/2011 | Downs et al. | |
| 7,899,796 B1 | 3/2011 | Borthwick et al. | |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,941,321 B2 | 5/2011 | Greenstein et al. | |
| 7,961,188 B2 * | 6/2011 | Tolle | G06Q 10/10 |
| | | | 345/440 |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,970,240 B1 | 6/2011 | Chao et al. | |
| 7,971,150 B2 | 6/2011 | Raskutti et al. | |
| 7,984,374 B2 | 6/2011 | Caro et al. | |
| 8,001,465 B2 | 8/2011 | Kudrolli et al. | |
| 8,001,482 B2 | 8/2011 | Bhattiprolu et al. | |
| 8,010,545 B2 | 8/2011 | Stefik et al. | |
| 8,015,487 B2 | 9/2011 | Roy et al. | |
| 8,019,749 B2 | 9/2011 | Leban | |
| 8,024,778 B2 | 9/2011 | Cash et al. | |
| 8,036,632 B1 | 10/2011 | Cona et al. | |
| 8,036,971 B2 | 10/2011 | Aymeloglu et al. | |
| 8,037,046 B2 | 10/2011 | Udezue et al. | |
| 8,042,110 B1 | 10/2011 | Kawahara et al. | |
| 8,046,283 B2 | 10/2011 | Burns | |
| 8,054,756 B2 | 11/2011 | Chand et al. | |
| 8,103,543 B1 | 1/2012 | Zwicky | |
| 8,134,457 B2 | 3/2012 | Velipasalar et al. | |
| 8,145,703 B2 | 3/2012 | Frishert et al. | |
| 8,185,819 B2 | 5/2012 | Sah et al. | |
| 8,214,361 B1 | 7/2012 | Sandler et al. | |
| 8,214,490 B1 | 7/2012 | Vos et al. | |
| 8,214,764 B2 | 7/2012 | Gemmell et al. | |
| 8,225,201 B2 | 7/2012 | Michael | |
| 8,229,902 B2 | 7/2012 | Vishniac et al. | |
| 8,229,947 B2 | 7/2012 | Fujinaga | |
| 8,230,333 B2 | 7/2012 | Decherd et al. | |
| 8,249,885 B2 | 8/2012 | Berkowitz et al. | |
| 8,271,461 B2 | 9/2012 | Pike et al. | |
| 8,280,880 B1 | 10/2012 | Aymeloglu et al. | |
| 8,290,838 B1 | 10/2012 | Thakur et al. | |
| 8,290,926 B2 | 10/2012 | Ozzie et al. | |
| 8,290,942 B2 | 10/2012 | Jones et al. | |
| 8,301,464 B1 | 10/2012 | Cave et al. | |
| 8,301,904 B1 | 10/2012 | Gryaznov | |
| 8,302,855 B2 | 11/2012 | Ma et al. | |
| 8,312,367 B2 | 11/2012 | Foster | |
| 8,312,546 B2 | 11/2012 | Alme | |
| 8,352,881 B2 | 1/2013 | Champion et al. | |
| 8,368,695 B2 | 2/2013 | Howell et al. | |

(56) References Cited

U.S. PATENT DOCUMENTS

| | | | |
|---|---|---|---|
| 8,386,377 | B1 | 2/2013 | Xiong et al. |
| 8,397,171 | B2 | 3/2013 | Klassen et al. |
| 8,412,707 | B1 | 4/2013 | Mianji |
| 8,447,722 | B1 | 5/2013 | Ahuja et al. |
| 8,452,790 | B1 | 5/2013 | Mianji |
| 8,463,036 | B1 | 6/2013 | Ramesh et al. |
| 8,473,454 | B2 | 6/2013 | Evanitsky et al. |
| 8,484,115 | B2 | 7/2013 | Aymeloglu et al. |
| 8,489,331 | B2 | 7/2013 | Kopf et al. |
| 8,489,641 | B1 | 7/2013 | Seefeld et al. |
| 8,494,984 | B2 | 7/2013 | Hwang et al. |
| 8,498,984 | B1 | 7/2013 | Hwang et al. |
| 8,510,743 | B2 | 8/2013 | Hackborn et al. |
| 8,514,082 | B2 | 8/2013 | Cova et al. |
| 8,515,207 | B2 | 8/2013 | Chau |
| 8,554,579 | B2 | 10/2013 | Tribble et al. |
| 8,554,653 | B2 | 10/2013 | Falkenborg et al. |
| 8,554,709 | B2 | 10/2013 | Goodson et al. |
| 8,560,413 | B1 | 10/2013 | Quarterman |
| 8,577,911 | B1 | 11/2013 | Stepinski et al. |
| 8,589,273 | B2 | 11/2013 | Creeden et al. |
| 8,595,234 | B2 | 11/2013 | Siripurapu et al. |
| 8,620,641 | B2 | 12/2013 | Farnsworth et al. |
| 8,646,080 | B2 | 2/2014 | Williamson et al. |
| 8,639,757 | B1 | 3/2014 | Adams et al. |
| 8,676,857 | B1 | 3/2014 | Adams et al. |
| 8,688,573 | B1 | 4/2014 | Rukonic et al. |
| 8,689,108 | B1 | 4/2014 | Duffield et al. |
| 8,713,467 | B1 | 4/2014 | Goldenberg et al. |
| 8,726,379 | B1 | 5/2014 | Stiansen et al. |
| 8,739,278 | B2 | 5/2014 | Varghese |
| 8,799,799 | B1 | 5/2014 | Cervelli et al. |
| 8,742,934 | B1 | 6/2014 | Sarpy et al. |
| 8,744,890 | B1 | 6/2014 | Bernier |
| 8,745,516 | B2 | 6/2014 | Mason et al. |
| 8,781,169 | B2 | 7/2014 | Jackson et al. |
| 8,787,939 | B2 | 7/2014 | Papakipos et al. |
| 8,788,407 | B1 | 7/2014 | Singh et al. |
| 8,806,355 | B2 | 8/2014 | Twiss et al. |
| 8,812,960 | B1 | 8/2014 | Sun et al. |
| 8,830,322 | B2 | 9/2014 | Nerayoff et al. |
| 8,832,594 | B1 | 9/2014 | Thompson et al. |
| 8,868,537 | B1 | 10/2014 | Colgrove et al. |
| 8,917,274 | B2 | 12/2014 | Ma et al. |
| 8,924,388 | B2 | 12/2014 | Elliot et al. |
| 8,924,389 | B2 | 12/2014 | Elliot et al. |
| 8,924,872 | B1 | 12/2014 | Bogomolov et al. |
| 8,937,619 | B2 | 1/2015 | Sharma et al. |
| 8,938,686 | B1 | 1/2015 | Erenrich et al. |
| 8,949,164 | B1 | 2/2015 | Mohler |
| 9,009,171 | B1 | 4/2015 | Grossman et al. |
| 9,009,827 | B1 | 4/2015 | Albertson et al. |
| 9,021,260 | B1 | 4/2015 | Falk et al. |
| 9,021,384 | B1 | 4/2015 | Beard et al. |
| 9,043,696 | B1 | 5/2015 | Meiklejohn et al. |
| 9,043,894 | B1 | 5/2015 | Dennison et al. |
| 9,069,842 | B2 | 6/2015 | Melby |
| 9,100,428 | B1 | 8/2015 | Visbal |
| 9,111,281 | B2 | 8/2015 | Stibel et al. |
| 9,116,975 | B2 | 8/2015 | Shankar et al. |
| 9,129,219 | B1 | 9/2015 | Robertson et al. |
| 9,256,664 | B2 | 2/2016 | Chakerian et al. |
| 9,280,618 | B1 | 3/2016 | Bruce et al. |
| 9,286,373 | B2 | 3/2016 | Elliot et al. |
| 9,335,911 | B1* | 5/2016 | Elliot .................. G06F 3/04847 |
| 9,361,007 | B2* | 6/2016 | Dewan .................. G06Q 10/067 |
| 9,483,745 | B2 | 11/2016 | Ackermann et al. |
| 9,870,389 | B2 | 1/2018 | Elliot et al. |
| 10,157,200 | B2 | 12/2018 | Elliot et al. |
| 10,656,779 | B1* | 5/2020 | Rueter ................ G06F 16/9038 |
| 10,678,783 | B2 | 6/2020 | Elliot et al. |
| 11,119,762 | B1* | 9/2021 | Bush .................. G06F 11/3612 |
| 11,797,258 | B2* | 10/2023 | Moy ..................... G06F 3/0482 |
| 2002/0033848 | A1 | 3/2002 | Sciammarella et al. |
| 2002/0065708 | A1 | 5/2002 | Senay et al. |
| 2002/0091707 | A1 | 7/2002 | Keller |
| 2002/0095360 | A1 | 7/2002 | Joao |
| 2002/0095658 | A1 | 7/2002 | Shulman |
| 2002/0103705 | A1 | 8/2002 | Brady |
| 2002/0116120 | A1 | 8/2002 | Ruiz et al. |
| 2002/0147805 | A1 | 10/2002 | Leshem et al. |
| 2002/0174201 | A1 | 11/2002 | Ramer et al. |
| 2002/0194119 | A1 | 12/2002 | Wright et al. |
| 2003/0028560 | A1 | 2/2003 | Kudrolli et al. |
| 2003/0036848 | A1 | 2/2003 | Sheha et al. |
| 2003/0039948 | A1 | 2/2003 | Donahue |
| 2003/0097364 | A1 | 5/2003 | Bata |
| 2003/0126102 | A1 | 7/2003 | Borthwick |
| 2003/0140106 | A1 | 7/2003 | Raguseo |
| 2003/0144868 | A1 | 7/2003 | MacIntyre et al. |
| 2003/0163352 | A1 | 8/2003 | Surpin et al. |
| 2003/0200217 | A1 | 10/2003 | Ackerman |
| 2003/0225755 | A1 | 12/2003 | Iwayama et al. |
| 2003/0229848 | A1 | 12/2003 | Arend et al. |
| 2004/0032432 | A1 | 2/2004 | Baynger |
| 2004/0034570 | A1 | 2/2004 | Davis |
| 2004/0064256 | A1 | 4/2004 | Barinek et al. |
| 2004/0085318 | A1 | 5/2004 | Hassler et al. |
| 2004/0095349 | A1 | 5/2004 | Bito et al. |
| 2004/0111410 | A1 | 6/2004 | Burgoon et al. |
| 2004/0111480 | A1 | 6/2004 | Yue |
| 2004/0126840 | A1 | 7/2004 | Cheng et al. |
| 2004/0143602 | A1 | 7/2004 | Ruiz et al. |
| 2004/0143796 | A1 | 7/2004 | Lerner et al. |
| 2004/0153418 | A1 | 8/2004 | Hanweck |
| 2004/0163039 | A1 | 8/2004 | McPherson et al. |
| 2004/0186845 | A1 | 9/2004 | Fukui |
| 2004/0193600 | A1 | 9/2004 | Kaasten et al. |
| 2004/0221223 | A1 | 11/2004 | Yu et al. |
| 2004/0236688 | A1 | 11/2004 | Bozeman |
| 2004/0260702 | A1 | 12/2004 | Cragun et al. |
| 2004/0267746 | A1 | 12/2004 | Marcjan et al. |
| 2005/0010472 | A1 | 1/2005 | Quatse et al. |
| 2005/0027705 | A1 | 2/2005 | Sadri et al. |
| 2005/0028094 | A1 | 2/2005 | Allyn |
| 2005/0039119 | A1 | 2/2005 | Parks et al. |
| 2005/0065811 | A1 | 3/2005 | Chu et al. |
| 2005/0080769 | A1 | 4/2005 | Gemmell |
| 2005/0080770 | A1 | 4/2005 | Lueder et al. |
| 2005/0086207 | A1 | 4/2005 | Heuer et al. |
| 2005/0125715 | A1 | 6/2005 | Franco et al. |
| 2005/0154628 | A1 | 7/2005 | Eckart et al. |
| 2005/0154769 | A1 | 7/2005 | Eckart et al. |
| 2005/0162523 | A1 | 7/2005 | Darrell et al. |
| 2005/0166144 | A1 | 7/2005 | Gross |
| 2005/0180330 | A1 | 8/2005 | Shapiro |
| 2005/0182793 | A1 | 8/2005 | Keenan et al. |
| 2005/0183005 | A1 | 8/2005 | Denoue et al. |
| 2005/0210409 | A1 | 9/2005 | Jou |
| 2005/0246327 | A1 | 11/2005 | Yeung et al. |
| 2005/0251786 | A1 | 11/2005 | Citron et al. |
| 2006/0026120 | A1 | 2/2006 | Carolan et al. |
| 2006/0026170 | A1 | 2/2006 | Kreitler et al. |
| 2006/0031209 | A1* | 2/2006 | Ahlberg ................ G06F 9/451 |
| 2006/0059139 | A1 | 3/2006 | Robinson |
| 2006/0074881 | A1 | 4/2006 | Vembu et al. |
| 2006/0080283 | A1 | 4/2006 | Shipman |
| 2006/0080619 | A1 | 4/2006 | Carlson et al. |
| 2006/0093222 | A1 | 5/2006 | Saffer et al. |
| 2006/0117055 | A1 | 6/2006 | Doyle |
| 2006/0129746 | A1 | 6/2006 | Porter |
| 2006/0139375 | A1 | 6/2006 | Rasmussen et al. |
| 2006/0142949 | A1 | 6/2006 | Helt |
| 2006/0143034 | A1 | 6/2006 | Rothermel |
| 2006/0143075 | A1 | 6/2006 | Carr et al. |
| 2006/0143079 | A1 | 6/2006 | Basak et al. |
| 2006/0143205 | A1 | 6/2006 | Fuchs |
| 2006/0149596 | A1 | 7/2006 | Surpin et al. |
| 2006/0203337 | A1 | 9/2006 | White |
| 2006/0218637 | A1 | 9/2006 | Thomas et al. |
| 2006/0241974 | A1 | 10/2006 | Chao et al. |
| 2006/0242040 | A1 | 10/2006 | Rader |
| 2006/0242630 | A1 | 10/2006 | Koike et al. |
| 2006/0271277 | A1 | 11/2006 | Hu et al. |

(56) References Cited

U.S. PATENT DOCUMENTS

| | | |
|---|---|---|
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0112737 A1 | 5/2007 | Carlson et al. |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0174760 A1 | 7/2007 | Chamberlain et al. |
| 2007/0185867 A1 | 8/2007 | Maga |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0065655 A1 | 3/2008 | Chakravarthy et al. |
| 2008/0065665 A1 | 3/2008 | Pomroy et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0103996 A1 | 5/2008 | Forman et al. |
| 2008/0104019 A1 | 5/2008 | Nath |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270328 A1 | 10/2008 | Lafferty et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1 | 11/2008 | Kim et al. |
| 2008/0294663 A1 | 11/2008 | Heinley et al. |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313281 A1 | 12/2008 | Scheidl et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0037912 A1 | 2/2009 | Stoitsev et al. |
| 2009/0043762 A1 | 2/2009 | Shiverick et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0157732 A1 | 6/2009 | Hao et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254572 A1 | 10/2009 | Redlich et al. |
| 2009/0254842 A1 | 10/2009 | Leacock et al. |
| 2009/0254970 A1 | 10/2009 | Agarwal et al. |
| 2009/0259636 A1 | 10/2009 | Labrou et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0310816 A1 | 12/2009 | Freire et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0037212 A1 | 2/2010 | Meijer et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070448 A1 | 3/2010 | Omoigui |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076979 A1 | 3/2010 | Wang et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106752 A1 | 4/2010 | Eckardt et al. |
| 2010/0114887 A1 | 5/2010 | Conway et al. |
| 2010/0114916 A1 | 5/2010 | Cooke |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0211535 A1 | 8/2010 | Rosenberger |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318924 A1 | 12/2010 | Frankel et al. |

(56) References Cited

U.S. PATENT DOCUMENTS

| | | |
|---|---|---|
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0040776 A1 | 2/2011 | Najm et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowitz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0314148 A1* | 12/2011 | Petersen ............ H04L 63/1408 709/224 |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0089606 A1 | 4/2012 | Eshwar et al. |
| 2012/0102074 A1* | 4/2012 | Mital .................. G06F 40/18 707/805 |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0154402 A1* | 6/2012 | Mital .................. G06T 11/206 345/440 |
| 2012/0158527 A1 | 6/2012 | Cannelongo et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0323889 A1 | 12/2012 | Marum et al. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |

(56) References Cited

U.S. PATENT DOCUMENTS

| | | |
|---|---|---|
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0318604 A1 | 11/2013 | Coates et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0053091 A1 | 2/2014 | Hou et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081685 A1 | 3/2014 | Thacker et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0214810 A1 | 7/2014 | Takeda |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0250377 A1 | 9/2014 | Bisca et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0280056 A1 | 9/2014 | Kelly |
| 2014/0282160 A1 | 9/2014 | Zarpas |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2014/0372956 A1 | 12/2014 | Bisca et al. |
| 2015/0019394 A1 | 1/2015 | Unser et al. |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0134666 A1 | 5/2015 | Gattiker et al. |
| 2015/0135256 A1 | 5/2015 | Hoy et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0220252 A1* | 8/2015 | Mital .................... G06T 11/206 |
| | | 715/763 |
| 2015/0227295 A1 | 8/2015 | Meiklejohn et al. |
| 2015/0242401 A1 | 8/2015 | Liu |
| 2015/0302036 A1* | 10/2015 | Kumar ............... G06F 16/3325 |
| | | 707/711 |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0379413 A1 | 12/2015 | Robertson et al. |
| 2016/0004610 A1 | 1/2016 | Knight |
| 2016/0004764 A1 | 1/2016 | Chakerian et al. |
| 2016/0034463 A1 | 2/2016 | Brewer |
| 2016/0098385 A1* | 4/2016 | Burke .................. G06F 3/04842 |
| | | 715/212 |
| 2016/0180557 A1 | 6/2016 | Yousaf et al. |
| 2016/0188682 A1* | 6/2016 | Silverstein ............. G06F 16/80 |
| | | 707/803 |
| 2016/0231915 A1* | 8/2016 | Nhan ................... G06F 40/186 |
| 2016/0267063 A1 | 9/2016 | Rajvanshi et al. |
| 2017/0069118 A1* | 3/2017 | Stewart ............... G06F 3/04845 |
| 2017/0154088 A1* | 6/2017 | Sherman ............ G06F 9/45558 |
| 2018/0039399 A1 | 2/2018 | Kaltegaertner et al. |
| 2018/0052597 A1* | 2/2018 | Stokes ................. G06T 11/206 |
| 2018/0081935 A1* | 3/2018 | Papale .................. G06F 16/248 |
| 2018/0129369 A1* | 5/2018 | Kim ..................... G06F 16/254 |
| 2018/0260985 A1* | 9/2018 | Ding .................... G06T 11/206 |
| 2019/0087454 A1* | 3/2019 | Elliot .................... G06F 3/0482 |
| 2019/0227824 A1* | 7/2019 | Kuchoor ................ G06F 16/26 |
| 2021/0109923 A1* | 4/2021 | Chakra ................... G06F 16/26 |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2487610 | 8/2012 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |

(56) References Cited

FOREIGN PATENT DOCUMENTS

| | | |
|---|---|---|
| EP | 2911100 | 8/2015 |
| EP | 2940603 | 11/2015 |
| EP | 2940609 | 11/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| EP | 3340078 | 6/2018 |
| EP | 3809277 | 4/2021 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2002/065353 | 8/2002 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2012/061162 | 5/2012 |
| WO | WO 2013/010157 | 1/2013 |
| WO | WO 2013/102892 | 7/2013 |

OTHER PUBLICATIONS

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

Golem Xiv, "A Word About Banks and the Laundering of Drug Money," Aug. 18, 2012, http://www.golemxiv.co.uk/2012/08/a-word-about-banks-and-the-laundering-of-drug-money/, 21 pages.

Levi, "Money Laundering Risks and E-Gaming: A European Overview and Assessment," 2009, http://www.cf.ac.uk/socsi/resources/Levi_Final_Money_Laundering_Risks_egaming.pdf, 30 pages.

"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf, 6 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP Business Objects Explorer Online Help", SAP Business Objects, Mar. 19, 2012, pp. 68.

"The FASTA Program Package," fasta-36.3.4, Mar. 25, 2011, pp. 29.

Butkovic et al., "Using Whois Based Geolocation and Google Maps API for Support Cybercrime Investigations," Recent Advances in Telecommunications and Circuits: Proceedings of the 11th International Conference on Applied Electromagnetics, Wireless and Optical Communications (ELECTROSCIENCE '13), Proceedings of the 2nd International Conference on Circuits, Systems, Communications, Computers and Applications (CSCCA '13), Proceedings of the 1st International Conference on Solid State Circuits (SSC '13), Proceedings of the 1st International Conference on Antennas & Propagation (ANPRO '13) :Dubrovnik, Croatia, Jun. 25-27, 2013, pp. 194-200, 2013.

About 80 Minutes, "Palantir in a No. of Parts—Part 6—Graph," Mar. 21, 2013, pp. 1-6.

Acklen, Laura, "Absolute Beginner's Guide to Microsoft Word 2003," Dec. 24, 2003, pp. 15-18, 34-41, 308-316.

Alur et al., "Chapter 2: IBM InfoSphere DataStage Stages," IBM InfoSphere DataStage Data Flow and Job Design, Jul. 1, 2008, pp. 35-137.

Amnet, "5 Great Tools for Visualizing Your Twitter Followers," posted Aug. 4, 2010, http://www.amnetblog.com/component/content/article/115-5-grate-tools-for-visualizing-your-twitter-followers.html, 3 pages.

Ananiev et al., "The New Modality API," http://web.archive.org/web/20061211011958/http://java.sun.com/developer/technicalArticles/J2SE/Desktop/javase6/modality/, Jan. 21, 2006, pp. 8.

Anonymous, "Persistent data structure—Wikipedia", Aug. 13, 2016, pp. 1-9, Retrieved from the Internet: URL: https://en.wikipedia.org/w/index.php?t itle= Persistent -data -structure&oldid=73424 0973, retrieved on Feb. 9, 2018.

Appacts, "Smart Thinking for Super Apps," http://www.appacts.com Printed Jul. 18, 2013 in 4 pages.

Apsalar, "Data Powered Mobile Advertising," "Free Mobile App Analytics" and various analytics related screen shots http://apsalar.com Printed Jul. 18, 2013 in 8 pages.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf, 1111 pages.

Brooks et al., "Hoptrees: Branching History Navigation for Hierarchies," Sep. 2, 2013, Network and Parallel Computing, pp. 316-333.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Capptain—Pilot Your Apps, http://www.capptain.com Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015, 58 pages.

Chaudhuri et al., "An Overview of Business Intelligence Technology," Communications of the ACM, Aug. 2011, vol. 54, No. 8, 11 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Cohn et al., "Semi-supervised Clustering with User Feedback," Constrained Clustering: Advances in Algorithms, Theory, and Applications 4.1, 2003, pp. 17-32.

Conner, Nancy, "Google Apps: The Missing Manual," May 1, 2008, pp. 17.

Countly Mobile Analytics, http://count.ly/ Printed Jul. 18, 2013 in 9 pages.

Definition "Identify" downloaded Jan. 22, 2015, 1 page.

Definition "Overlay" downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

DISTIMO—App Analytics, http://www.distimo.com/app-analytics Printed Jul. 18, 2013 in 5 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Driscoll, James et al: "Making Data Structures Persistent", Journal of Computer and System Sciences, vol. 38, Feb. 1, 1989, pp. 86-124.

Flurry Analytics, http://www.flurry.com/ Printed Jul. 18, 2013 in 14 pages.

Gesher, Ari, "Palantir Screenshots in the Wild: Swing Sightings," The Palantir Blog, Sep. 11, 2007, pp. 1-12.

Gill et al., "Computerised Linking of Medical Records: Methodological Guidelines," Journal of Epidemiology and Community Health, 1993, vol. 47, pp. 316-319.

(56) References Cited

OTHER PUBLICATIONS

GIS-NET 3 Public—Department of Regional Planning. Planning & Zoning Information for Unincorporated La County. Retrieved Oct. 2, 2013 from http://gis.planning.lacounty.gov/GIS-NET3_Public/Viewer.html, 2 pages.

Glaab et al., "EnrichNet: Network-Based Gene Set Enrichment Analysis," Bioinformatics 28.18 (2012): pp. i451-i457.

Google Analytics Official Website—Web Analytics & Reporting, http://www.google.com/analytics.index.html Printed Jul. 18, 2013 in 22 pages.

Gorr et al., "Crime Hot Spot Forecasting: Modeling and Comparative Evaluation," Grant 98-IJ-CX-K005, May 6, 2002, 37 pages.

Griffith, Daniel A., "A Generalized Huff Model," Geographical Analysis, Apr. 1982, vol. 14, No. 2, pp. 135-144.

Gu et al., "Record Linkage: Current Practice and Future Directions," Jan. 15, 2004, pp. 32.

Hansen et al. "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hibbert et al., "Prediction of Shopping Behavior Using a Huff Model Within a GIS Framework," Healthy Eating in Context, Mar. 18, 2011, pp. 16.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Hua et al., "A Multi-attribute Data Structure with Parallel Bloom Filters for Network Services" HiPC 2006, LNCS 4297, pp. 277-288, 2006.

Huang et al., "Systematic and Integrative Analysis of Large Gene Lists Using DAVID Bioinformatics Resources," Nature Protocols, 4.1, 2009, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Hur et al., "SciMiner: web-based literature mining tool for target identification and functional enrichment analysis," Bioinformatics 25.6 (2009): pp. 838-840.

IBM, Determining Business Object Structure, IBM, 2004, pp. 9.

Kahan et al., "Annotea: an open RDF infrastructure for shared WEB annotations", Computer Networks 39, pp. 589-608, 2002.

Karger, David, "Lecture 2: Persistent Data 1-15 Structures, MIT Course on Advanced Algorithms", Sep. 9, 2005, pp. 1-5, Retrieved from the Internet URL: https://ocw.mit.edu/courses/electrical-engineering-and-computer-science/6-854j-advanced-algorithms-fall-2005/lecture-notes /persistent.pdf, retrieved on Feb. 9, 2018.

Keylines.com, "An Introduction to KeyLines and Network Visualization," Mar. 2014,|http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Kitts, Paul, "Chapter 14: Genome Assembly and Annotation Process," The NCBI Handbook, Oct. 2002, pp. 1-21.

Kontagent Mobile Analytics, http://www.kontagent.com/ Printed Jul. 18, 2013 in 9 pages.

Li et al., "Interactive Multimodal Visual Search on Mobile Device," IEEE Transactions on Multimedia, vol. 15, No. 3, Apr. 1, 2013, pp. 594-607.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Localytics—Mobile App Marketing & Analytics, http://www.localytics.com/ Printed Jul. 18, 2013 in 12 pages.

Madden, Tom, "Chapter 16: The BLAST Sequence Analysis Tool," The NCBI Handbook, Oct. 2002, pp. 1-15.

Manno et al., "Introducing Collaboration in Single-user Applications through the Centralized Control Architecture," 2010, pp. 10.

Manske, "File Saving Dialogs," http://www.mozilla.org/editor/ui_specs/FileSaveDialogs.html, Jan. 20, 1999, pp. 7.

Map of San Jose, CA. Retrieved Oct. 2, 2013 from http://maps.yahoo.com, 1 page.

Map of San Jose, CA. Retrieved Oct. 2, 2013 from http://maps.bing.com, 1 page.

Map of San Jose, CA. Retrieved Oct. 2, 2013 from http://maps.google.com, 1 page.

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.

Microsoft Office—Visio, "About connecting shapes," http://office.microsoft.com/en-us/visio-help/about-connecting-shapes-HP085050369.aspx printed Aug. 4, 2011 in 6 pages.

Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.

Mixpanel—Mobile Analytics, https://mixpanel.com/ Printed Jul. 18, 2013 in 13 pages.

Mizrachi, Ilene, "Chapter 1: GenBank: The Nuckeotide Sequence Database," The NCBI Handbook, Oct. 2002, pp. 1-14.

Nierman, "Evaluating Structural Similarity in XML Documents," 2002, 6 pages.

Nolan et al., "MCARTA: A Malicious Code Automated Run-Time Analysis Framework," Homeland Security, 2012 IEEE Conference on Technologies for, Nov. 13, 2012, pp. 13-17.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Open Web Analytics (OWA), http://www.openwebanalytics.com/ Printed Jul. 19, 2013 in 5 pages.

Palantir Technologies, "Palantir Labs—Timeline," Oct. 1, 2010, retrieved from the internet https://www.youtube.com/watch?v=JCgDW5bru9M, 1 page.

Palmas et al., "An Edge-Bunding Layout for Interactive Parallel Coordinates" 2014 IEEE Pacific Visualization Symposium, pp. 57-64.

Perdisci et al., "Behavioral Clustering of HTTP-Based Malware and Signature Generation Using Malicious Network Traces," USENIX, Mar. 18, 2010, pp. 1-14.

Piwik—Free Web Analytics Software. http://piwik.org/ Printed Jul. 19, 2013 in 18 pages.

Quest, "Toad for Oracle 11.6—Guide to Using Toad," Sep. 24, 2012, pp. 1-162.

Rouse, Margaret, "OLAP Cube," http://searchdatamanagement.techtarget.com/definition/OLAP-cube, Apr. 28, 2012, pp. 16.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

StatCounter—Free Invisible Web Tracker, Hit Counter and Web Stats, http://statcounter.com/ Printed Jul. 19, 2013 in 17 pages.

(56) References Cited

OTHER PUBLICATIONS

Symantec Corporation, "E-Security Begins with Sound Security Policies," Announcement Symantec, Jun. 14, 2001, 12 pages.
TestFlight—Beta Testing on The Fly, http://testflightapp.com/ Printed Jul. 18, 2013 in 3 pages.
Thompson, Mick, "Getting Started with GEO," Getting Started with GEO, Jul. 26, 2011, 3 pages.
Trak.io, http://trak.io/ printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, http://usermetrix.com/android-analytics printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Federated Database System," Sep. 7, 2013, retrieved from the internet on Jan. 27, 2015 http://en.wikipedia.org/w/index.php?title=Federated_database_system&oldid=571954221, 6 pages.
Wikipedia, "Multimap," Jan. 1, 2013, https://en.wikipedia.org/w/index.php?title=Multimap&oldid=530800748, 2 pages.
Wikipedia, "Mobile Web," Jan. 23, 2015, retrieved from the internet on Mar. 15, 2016 https://en.wikipedia.org/w/index.php?title=Mobile_Web&oldid=643800164, 6 pages.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016, 11 pages.
Wright et al., "Palantir Technologies VAST 2010 Challenge Text Records—Investigations into Arms Dealing," Oct. 29, 2010, pp. 1-10.
Yang et al., "HTML Page Analysis Based on Visual Cues," 2001, pp. 859-864.
Zheng et al., "GOEAST: a web-based software toolkit for Gene Ontology enrichment analysis," Nucleic Acids Research, vol. 36, (2008): pp W385-W363.
Official Communication for European Patent Application No. 15202919.5 dated May 9, 2016, 13 pages.
Official Communication for European Patent Application No. 15202919.5 dated Jun. 12, 2017, 8 pages.
Official Communication for European Patent Application No. 15202919.5 dated May 3, 2018, 10 pages.
Official Communication for European Patent Application No. 17208655.5 dated Mar. 6, 2018, 11 pages.
Official Communication for European Patent Application No. 17208655.5 dated Nov. 19, 2020, 7 pages.
Official Communication for European Patent Application No. 17208655.5 dated Dec. 18, 2020, 6 pages.
Official Communication for European Patent Application No. 20202243.0 dated Mar. 12, 2021, 10 pages.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Armand Ruiz, "Watson Analytics, SPSS Modeler and Esri ArcGIS," available at https://www.youtube.com/watch?v=fk49hw4OrN4, as published on Jul. 28, 2015.
Esri News, "IBM and Esri Team Up to Offer Cognitive Analyrics and IoT in the IBM Cloud,"http://www.esri.com/esri-news/releases/16-4qtr/IBM-and-esri-team-up-to-offer-cognitive-analytics-and-iot-in-the-IBM-cloud, as published on Oct. 26, 2016, in 2 pages.
Goyal, Manish, "Announcing our largest release of Watson Developer Cloud services," IBM developerWorks/Developer Centers, posted Sep. 24, 2015 in 6 pages, https://developer.ibm.com/watson/blog/2015/09/24/announcing-our-largest-release-of-watson-developer-cloud-services/.
IBM Analytics Communities, "Creating a map visualization for UK coordinates,"https://community.watsonanalytics.com/discussions/questions/3753/creating-a-map-visualisation-for-uk-coordinates.html, as printed Mar. 9, 2017 in 1 page.
IBM Analytics Communities, "Is IBM SPSS statistics now integrated to WatsonAnalytics?" https://community.watsonanalytics.com/discussions/questions/1464/is-ibm-spss-statistics-now-integrated-to-watsonana.html, as printed Mar. 7, 2017 in 2 pages.
IBM Analytics, "IBM SPSS software and Watson Analytics: A powerful combo for the cognitive age," available at https://www.youtube.com/watch?v=AvYctzFf8gc, as published on Apr. 14, 2016.
IBM Knowledge Center, "Merge Node," https://www.ibm.com/support/knowledgecenter/en/SS3RA7_15.0.0/com.IBM.spss.modeler.help/merge_overview.htm[ibm.com], as printed Feb. 14, 2017 in 1 page.
IBM Knowledge Center, "New features in IBM SPSS Modeler Professional," https://www.ibm.com/support/knowledgecenter/en/SS3RA7_15.0.0/com.ibm.spss.modeler.help/whatsnew_features_pro.htm[ibm.com], as printed Feb. 14, 2017 in 2 pages.
IBM Knowledge Center, "Overview—What's new in IBM Watson Explorer Content Analytics Version 10.0," https://www.ibm.com/support/knowledgecenter/en/SS8NLW_10.0.0/com.IBM.discovery.es.nav.doc/iiysawhatsnew.htm, as printed Mar. 6, 2017 in 4 pages.
IBM Predictive Analytics, https://www.ibm.com/analytics/us/en/technology/predictive-analytics/, as printed Feb. 15, 2017 in 12 pages.
IBM SPSS Modeler, https://www.ibm.com/us-en/marketplace/spss-modeler, as printed Feb. 15, 2017 in 5 pages.
IBM Support, "Software lifecycle—Watson Explorer 10.0.0," https://www-01.ibm.com/software/support/lifecycleapp/PLCDetail.wss?q45=T283072T66911H98, as printed Mar. 7, 2017 in 1 page.
Yates, Rob, "Introducing the IBM Watson Natural Language Classifier," IBM developerWorks/Developer Centers, posted Jul. 10, 2015 in 4 pages, https://developer.ibm.com/watson/blog/2015/07/10/the-IBM-watson-natural-language-classifier/.
Official Communication for European Patent Application No. 17208655.5 dated Oct. 19, 2021, 13 pages.
Official Communication for European Patent Application No. 20202243.0 dated May 15, 2023, 9 pages.
Official Communication for European Patent Application No. 20202243.0 dated Feb. 7, 2024, 15 pages.
DataWalk: "DataWalk—Fast Testing of Fraud Scenarios", Nov. 28, 2016, XP093038486, retrieved from the internet: https://www.youtube.com/watch?v=FGE_TCx44yY (retrieved on Apr. 12, 2023), 15 pages.
Official Communication for European Patent Application No. 20202243.0 dated Jul. 15, 2024, 19 pages.

* cited by examiner

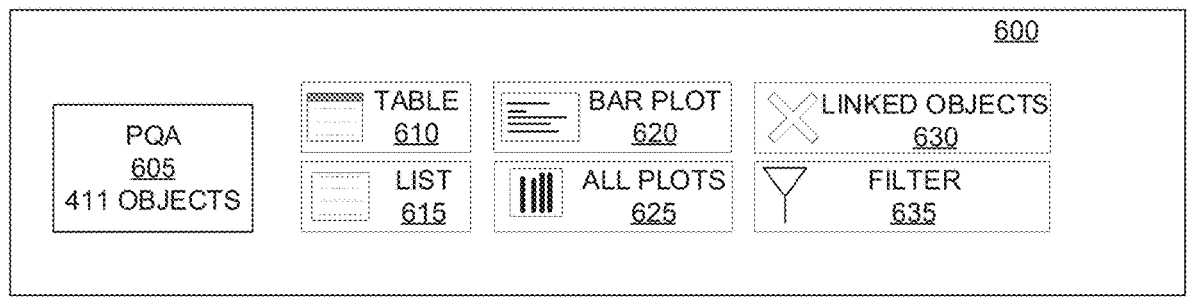
FIG. 6A
FIG. 6B
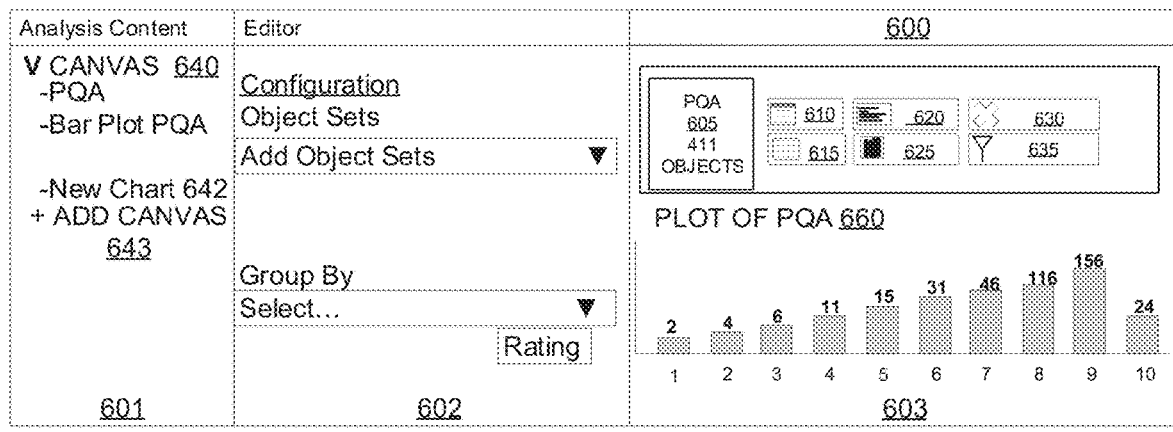
FIG. 6C

OBJECT-CENTRIC DATA ANALYSIS SYSTEM AND ASSOCIATED GRAPHICAL USER INTERFACES

TECHNICAL FIELD

The present disclosure relates to systems and techniques for analyzing data objects using an object-centric methodology that can be re-applied to other selected set objects in the data set.

BACKGROUND

Systems monitoring processes or operations of a system, or data generated by multiple events, can collect time-series data, which may include numerous data samples and a corresponding time/date indication of when each data sample was collected. For processes or operations of a system, time-series data may be related to a number of characteristics and properties, for example, including temperature, pressure, pH, light, infrared (IR), ultraviolet (UV), acceleration, dissolved oxygen, optical clarity, $CO^2$, motion, rotational motion, vibration, sound, voltage, current, capacitance, electromagnetic radiation, altitude, fluid flow, radiation, optical, and moisture, proximity and the like. In different contexts, the collection of the data from a plurality of sensors can correspond to a discrete grouping of events such as a trip or segment of a trip, a chemical reaction in a plant or factory, or a product assembly in a factory.

SUMMARY

Large data sets can include a large number of related data objects and associated time-series data. Analysis of such a data set can start with selecting several time-series and/or non-time-series data (which may be collectively referred to herein as "data"), displaying the data in plots, and manipulating the data to gain insight into association of objects related to the displayed data. While analyzing data objects using an ontology oriented methodology can offer advantages for some data sets, certain data sets may include many associated objects and complicated object associations that are helpful to analyze before analyzing the data itself, and thus using a time-series centric methodology may be inefficient for some analysis. For example, the analysis of certain data sets may benefit from down-selecting objects before reviewing data of certain aspects of the down-selected objects. However, there is no system to adequately provide an object-oriented methodology using associated objects in a data set used as the starting point for such an analysis. In addition, there is no system that tracks and displays the steps performed for down-selecting and filtering objects of a data set, presenting data of down-selected and filtered objects, and then re-applying such an analysis to another selected set objects in the data set.

Embodiments of systems, software application and user interfaces of a data analysis system configured for sequential analysis of time-series data and/or non-time series data ("data") provide an object-orientated methodology for analyzing a set of objects that are related in one or more ways. In an example workflow, a user can generate a visualization based on a group of the set of data objects. The visualization can be generated using tools provided on the object-centric user interface and provides the user insight into interesting relationships between the data objects. For example, the user interface can display objects in a table, a list, a bar chart or other types of plots, providing a data visualization for analysis and further selection. The user can select and "drill down" on a subset of the group of data objects via a selection in the data visualization, thereby creating a selection of a new group of data objects. The new group of objects can be (and usually is) a subset of the original group of data objects. This can optionally be repeated as desired to continue to drill down into the group of objects. The user interface can also produce plots showing non-time series data, and/or time-series data, related to selected data objects. By selecting a portion of the plotted data, further drill-down into the group of data objects can be performed. In another example workflow, a user can select a group of data objects, and do a search for "linked objects" to an object(s) in the group of objects, thereby creating a selection of a new group of data objects. The "linked object" functionality, or another tool, can optionally be repeated as desired to further drill down into the group of objects.

As one example of an innovation, a system includes one or more non-transitory computer storage mediums configured to store at least a plurality of sets of data objects including a first set of data objects and a second set of data objects, and the data objects in the plurality of sets of data objects including links to other data objects, and computer-executable instructions. The system also includes one or more computer hardware processors in communication with the one or more non-transitory computer storage mediums, the one or more computer hardware processors configured to execute the computer-executable instructions to at least: present the plurality of sets of data objects in a selectable format on a display device, receive a user selection of the first set of data objects, generate a user interface comprising a visualization of the first set of data objects and a plurality of selectable tools configured to select and present on the user interface aspects of the first set of objects, receive user selections of one or more of the tools to cause respective one or more operations to occur on the first set of data objects in an analysis session for the set of data objects, update the user interface to comprise a first visualization based on the one or more operations performed on the first set of data objects in the analysis session, receive a user selection of the second set of data objects, receive a user selection to cause the application of the one or more operations to the second set of data objects; and update the user interface to comprise a second visualization based on the one or more operations performed on the second set of data objects. One or more of the sets of data objects can include time-series data or non-time series data. The plurality of tools can include a tool configured to generate a user interface that displays at least a portion of the first set of data objects in a list, a table, a bar plot, or another type of plot. The plurality of tools can also include a tool configured to generate a user interface that displays one or more data objects linked to data objects in the first set of data objects. The one or more computer hardware processors can be further configured to execute the computer-executable instructions to generate and display on a user interface a graph depicting information on the one or more operations that have been performed on the first set of data objects, the graph including a plurality of nodes, each of the plurality of nodes representing a respective operation of the one or more operations that has been performed on the first set of data objects.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, the design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in systems, methods and/or user interfaces described herein which may provide significant performance and control benefits. For example, embodiments may involve time-series sensor data or non-time-series sensor data as data objects. The sensor data have been obtained from one or more technical systems or technical processes. Other embodiments may involve indexing portions of sensor data as data objects for subsequent identification and retrieval such that two or more selected portions may be aligned, which is useful for visualization of corresponding data to identify, for example, erroneous or surprising conditions (which may prompt further interaction through the interactive user interface, for example to shut down or take off-line a technical system or sensor) but, in some circumstances, may allow control of one or more technical system or sensors to be performed automatically. For example, the further interaction through the interactive user interface described herein may not only assist the user in shutting down or taking off-line a technical system or sensor but may assist the user in performing a technical task by means of a continued and/or guided human-machine interaction. For example, the content of the information presented to the user relates to an internal state prevailing in a technical system and enables the user to properly operate this technical system. An internal state prevailing in a technical system may be an operating mode, a technical condition or an event which may be related to the internal functioning of the system, may dynamically change and may be automatically detected. Its presentation typically prompts the user to interact with the system, for example to avoid technical malfunctions. For example, user interaction with the interactive user interfaces described herein may provide an optimized display of time-series data or non-time-series data and may enable a user to more quickly access, navigate, assess, and digest such information than previous systems, and may guide and/or prompt users to take one or more affirmative actions to control one or more systems or sensors based on the displayed time-series or non-time-series data.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, averages, correlations, and other statistical information. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described herein in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 6A illustrates an example of a user interface illustrating the selection of a first set of data objects.

FIG. 6B illustrates an example of a user interface presenting a selected set of data objects and options presented on a user interface for analyzing the set of data objects.

FIG. 6C illustrates an example of a user interface presenting a selected set of data objects and options presented on a user interface, and a plot of the set of data objects that was generated based on a user input selection indicating how o group the data.

DETAILED DESCRIPTION

Overview

Figure 1:
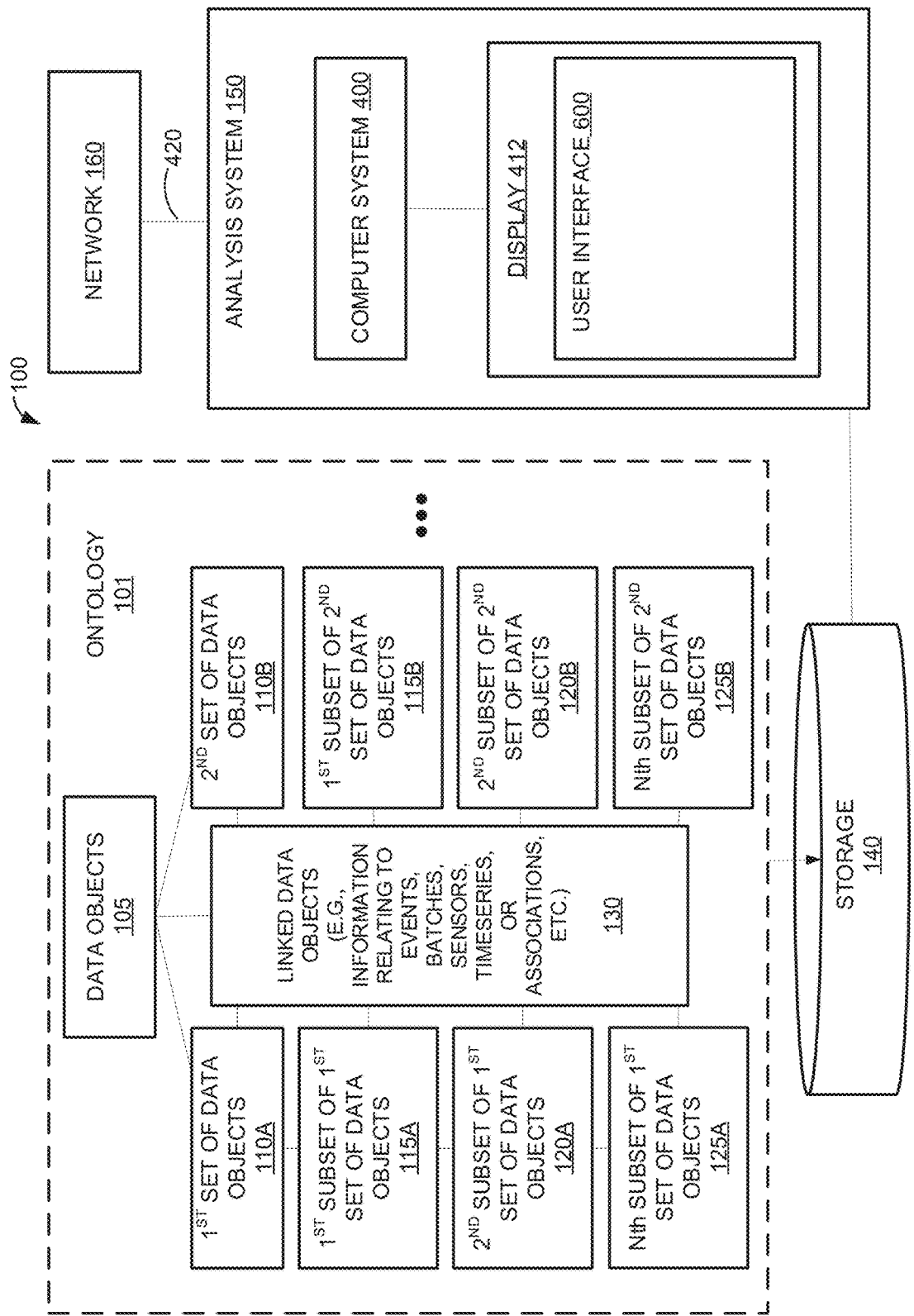
FIG. 1 illustrates an example of a schematic of an overview of storing data in a data store system, the data including a plurality of sets of data objects that are defined by an ontology, the data objects having links to other data objects. The data storage system is in communication with an analysis system configured for analyzing the stored data in an object-centric methodology.

Large data sets can include a large number of related data objects (e.g., linked objects) and associated time-series or non-time-series data ("data"). In an example, analysis of such a data set can start with selecting several time-series data, displaying the data in plots, and manipulating the time-series data to gain insight into association of objects related to the displayed time-series. Analysis of such data set can also start with selecting a data object, generating a user interface comprising a visualization displaying objects linked to the selected object, the user interface also having a plurality of selectable tools configured to select and present on the user interface aspects of the first set of data objects and objects linked to the selected object. The user interface can receive user selections of one or more of the tools to cause one or more operations to occur on the first set of data objects in an analysis session for the set of data objects.

Analyzing data objects using data centric methodology can offer certain advantages for some data sets, certain data sets may include many associated objects and complicated object associations, and using a data centric methodology may be inefficient for the analysis desired. The analysis of certain data sets may benefit from down-selecting objects before reviewing time-series of certain aspects of the down-selected objects. Systems that provide an object-oriented methodology using associated objects in a data set used as the starting point for such an analysis can provide advantages in efficiency and providing greater insight into a data set. In addition, a system that tracks and displays the steps performed for down-selecting and filtering objects of a data set, presenting data of down-selected and filtered objects, and then re-applying such an analysis to another selected set objects in the data set can help a user to navigate through varied analysis paths for a data set.

Software application and user interfaces of a data analysis system configured for sequential analysis of data provide an object-orientated methodology for analyzing a set of data objects. An object-centric user interface supports initial selection of a group of data objects, the types of which are defined by an ontology. In an example workflow, a user can generate a visualization based on the group of data objects. The visualization can be generated using tools provided on the object-centric user interface. For example, that display objects in a table, a list, a bar chart or other types of plots. The user can then "drill down" on a subset of the group of data objects via a selection in the visualization, thereby creating a selection of a new group of data objects. The new group of data objects can be (and usually is) a subset of the original group of data objects. This can optionally be repeated as desired to continue to drill down into the group of data objects. The user interface can also produce plots showing time-series data related to selected data objects. By selecting a portion of one or more plots of time-series data representing a portion if the group of data objects or data objects linked to the group of data objects, further drill-down into the group of data objects, and data objects linked to the group of data objects, can be performed. In an example, selection of the portion of the time-series data may be done by receiving a user input indicating a selection of a portion of a visualization of time-series data displayed in a plot on a user interface. In another example, selection of the portion of the non-time-series data may be done by receiving a user input indicating the data displayed in a plot, table, or other numerical or graphical representation on a user interface.

In another example workflow of a data analysis system, a user can select a group of data objects from a plurality of data objects, and do a search for "linked objects" to an object(s) in the group of objects (e.g., using a "linked object" tool provided on a user interface of the system), thereby creating a selection of a new group of data objects. The "linked object" functionality, or another tool, can optionally be repeated as desired to further drill down into the group of data objects. For a selected group of data objects, the linked object functionality can provide a listing of all data objects that are linked to any one of the data objects in the group of data objects. A data object can be selected from the listing of linked data objects, and information of the linked data object can be presented in a visualization on a user interface for further analysis. For example, a batch data object may be linked to one or more sensor data objects, which can be time-series and/or non-time-series data. The "linked object" functionality can be applied to the batch data object to identify a listing of the one or more sensor data objects that are linked to the batch data object. A sensor data object can be selected from the listing, and information (e.g., time-series and/or non-time series data) relating to the selected sensor data object can be displayed in a visualization on the user interface.

The user interface also generates a "Graph View" depicting a representation of the operations (selections, filtering, etc.) conducted by the user on the data objects. Once an analysis is completed for the initial data objects, the user may further select a new set of data objects and apply the operations in the Graph View to the new data objects. The provenance of the sequential analysis is maintained by the Graph View, and the user may edit the analysis at any point, causing automatic downstream updates The object-centric interaction user interface offers many advantages. It increases efficiency of finding objects for further analysis in a set of objects, allows objects to be visualized in different ways, allows drill-down into objects that are associated in the selected set of objects, allows various analysis of data objects through certain "unions," "intersections," and "differences" of selected objects, and allows time-series and/or non-time-series data of any of the object results to be displayed. When a time-series and/or non-time-series data is displayed, portions of the data can be selected for further analysis of related objects. The data analysis system is configured to provide efficient use of database queries (e.g., to retrieve data from a storage device). When an operation is performed that generates a first database query to provide certain information dictated by the operation, the information returned from the first database query can be saved. A subsequent similar operation that requires the same database query, or a database query that would return a subset of the same information as the first database query, can be provided to the subsequent operation thus reducing the number of database queries needed during a workflow. The object-centric interaction user interface described herein provides a fast, flexible and interpretable visualizations on a user interface of the data objects and the operations performed during the data analysis.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium, component, and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a batch (see below), a sensor, a person, a place, an organization, a market instrument, or other noun. A data object can represent an event or a group of events that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Batch Type, Sensor Type, Person, Event, or Document). Object types may be defined by an ontology and may be modified or updated to include additional object types. An object definition (e.g., in an ontology) may include how the object is related to other objects, such as being a sub-object type of another object type (e.g., a particular batch type can be associated with one or more other sensor types, or an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time-series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Batch: As used herein is a broad term that refers to something that changes over time. A batch generally is associated with a start time and an end time, and may be monitored over a time period to collect data, the data being associated with a time during the batch (e.g., collected at an instance of time, or collected during a period of time during the batch). Time-series data is an example of data that may be associated with a batch. Non-time-series data is another example of data that may be associated with a batch. In one example, a batch may refer to a process where a material or substance is subject to one or more events (or processes) that cause one or more changes to the material or substance, for example, a grouping of related events processes or operations may comprise a batch. In another example, a batch may refer to the occurrence of a certain thing, a certain event, or portion of an event, that occurs numerous times. For example, the event of a train traveling from Chicago to Milwaukee may be referred to as a batch, and information that occurs on the train relating to the train itself (e.g., mechanical information), or to anything that happens on the train (e.g., passengers getting on and off, money spent in the restaurant car, communications made via the trains Wi-Fi network, etc.) can be part of the data collected for the batch.

In another example, the instances when a submarine submerges between 33 feet and 330 feet may be referred to as a batch, and during such a batch numerous data may be collected regarding the equipment operating on the submarine, or information relating to integrity of the hull maybe collected. In another example, a batch may refer to a circumstance or situation when a system, or a portion of a system, operates and is monitored over a period of time. In another example, a car driving from point A to Point B, or for a certain duration of time, can be referred to as a batch. Similarly, a system operating (e.g., to heat water, refine oil, make food products, travel from point A to point B, etc.) may be referred to as a batch. In another example, the processing of a material (any substance, e.g., water, beer, concrete, oil, produce, paint, etc.) being operated on by a system may also be referred to as a batch. One or more sensors or processes can be used to collect data associated with a batch, and/or one or more users can monitor a batch and provide input to a batch.

A portion of an event or process may also be referred to batch if information is collected during the event or process. For example, a batch may refer to a baseball pitch/hit event, where a movement of a baseball (e.g., position, velocity, trajectory, rotation, etc.) is monitored as it travels from the pitcher's hand to the batter, and then from the batter's bat to the outfield. A batch may also refer to a portion of the baseball pitch/hit event, for example, only the portion from where a bat hits the baseball and the baseball travels to the outfield. In some cases, batch data may be collected for a baseball pitch/hit event and then later it is decided to look at a portion of the collected data as a separate batch, for example, only the portion of the movement of the baseball after the baseball is hit by the bat. In such cases, the pitch/hit batch can be analyzed by storing as separate metadata the exact start and end times of each time during a game a baseball leaves the pitcher's hand, gets hit by the bat and travels to the outfield during a pitch/hit event. By generating and storing said metadata, a search can be done on the data. For example, subsequently, a search can be done on the pitch/hit event batch data to identify a set of start/stop times when the baseball is hit by the bat and has traveled 100 feet from the batter, and those can be considered to be a set of batches and analyzed.

In some embodiments, a user can also monitor a batch and characterize the batch at one or more time instances over a period of time, e.g., characterize the quality of the batch, or how well the batch is operating. In some embodiments, additional information relating to the batch may be determined. For example, determined information may be generated by a combination of data from two or more sensors, or by taking a sample of a substance that is associated with the batch and performing quality analysis of the substance. In another example, determined information may be generated by a combination of data from one or more sensors and user input (e.g., a user input characterizing quality). A batch may be represented as a data object, or as a collection of data objects, where characteristics of the batch, (e.g., identification, start time, end time, time-series data collected by each sensor, non-time-series data collected by a sensor, and the like) may be represented as a data object.

Event: An occurrence that takes place over a time period, where time-series data and/or non-time-series data can be collected during the occurrence. An event may have a start time and/or an end time, or at least an indicated (or identified) start time and/or end time. An event generally occurs at a location. For some events, the location may cover a large geographic area. For example, an earthquake, ocean tides, and a space station falling out of orbit are examples of events that may occur across a large geographic area, and including above and below the earth's surface. For some other events, the location may be at a specific place, for example, a factory, an office, a home, outside or at a business. For example, baking a cake, the operation of an autonomous vehicle on a route, the actuation of a valve in a cooling system, heating liquid in a container, a cutting operation on a piece of industrial equipment, a particular operation of a system (or machinery) in a facility, a lap of a motorcycle around a race track, and a homerun are examples of events that occur that can occur at a specific place. An event may be characterized by two or more portions that may be referred to as sub-events or phases of the event. In some examples, a batch may undergo a change during one or more events.

Time-series Data: A series of information referenced to time. For example, a series of information that is sensed, collected, determined, and/or stored over a period of time, such that the information may be referenced by the time that it was sensed, collected, determined, and/or stored. As used herein in reference to time-series data, "information" is a broad term that may include sensor information and/or other types information that is collected either in reference to an instance of time or during a defined time period (e.g., milliseconds, seconds, minutes, hours, days, weeks, months, years, etc.). Time-series data can include the number of times an event occurs during a time period. Some examples of time-series data are provided here, but these examples are not meant to limit the type of information that can be included in time-series data. In some examples, time-series of information may be generated by a sensor monitoring a characteristic, for example, temperature, pressure, pH, light or radiation, dissolved oxygen, carbon dioxide, gas composition, size, vibration, or movement. In some examples, time-series data may be a count of a certain occurrence over a designated period of time, e.g., the number of people that pass through a turnstile every minute during a week; the number of cars that travel past a certain location in a city every five minutes for a year; the count of telephone calls a call center during consecutive 15 minute periods for a year; and the amount of money all the cash registers of a store collect during 30 minute time periods for a year; or the number of times a certain computer operation occurs (e.g., an error log or message is generated, a query is made, a certain communication is made) in a certain time period. In some examples, the series of information is determined by using data from one sensor and other information, for example, data from another sensor or stored data. In another example the series information is determined by a user's input, for example, where the user input is a quality characterization.

Object-Centric Data Model

FIG. 1 illustrates a schematic of an example overview of a system 100 for analyzing data that includes information stored as data objects 105 in accordance with an ontology 101. The information can be stored on one or more storage devices 140 (referred to herein as "storage device 140" for ease of reference). The ontology defines the object types, their associated properties, and possibly some relationships/links among object types. The actual data objects may be of any of the types defined by the ontology. There may be many data objects of a given type defined by the ontology. The relationship or "link" between two data objects may be an aspect of the data, not the ontology. For example, an event data object maybe related to a person data object, because the person is associated with the event. The data analysis system 100 also includes an analysis system 150 in communication with the storage device 140. The data objects 105 may be linked to one or more other data objects 130. The storage device 140 is in communication with an analysis system 150 configured for analyzing data stored in an object-centric methodology. The analysis system 150 includes a computer system 400 coupled to a display 412, which can be used to present (or display) a user interface 600. The analysis system 150 can be coupled to one or more network links 420 two communicate with one or more networks 160. Examples of hardware and software related to the analysis system 150 are described in reference to FIG. 4.

Various examples of data objects that may be analyzed include sets of data objects that represent events or information having a time element indicative of when the information sample is collected (e.g., time-series data where a series of data is collected, or non-time series data where data is collected that may have a timestamp but is not a time series per se). The time element (e.g., a timestamp) can represent the date and the hour, minute, seconds, and/or fractions of a second when the information sample was collected. Examples of such data includes, but is not limited to, data generated by one or more sensors over a period of time (e.g., temperature, pH, pressure, etc.), events that are recorded over a period of time (e.g., stock prices), or the determined state of a thing over a period of time (quality information). Quality information may include time referenced input that a user makes relating to a condition of a batch. For example, a user may make a visual observation of a batch and enter the data quantifying the observation and the date/time when the observation was made. Or, a user may draw a sample of a batch and perform one or more processes on the sample to characterize a quality of the batch, and enter the data quantifying the sample. Such quality characteristics may, include but is not limited to, a user observation based on a user's vision, hearing, smell, taste, or touch. In some instances, the quality information is based on the user's experience.

The data objects 105 stored in the system 100 can include numerous sets of data objects, illustrated as a first set of data objects 110A, a second set of data objects 110B, etc. Each set of data objects 110A, 110B includes information that stored in accordance with an ontology. The stored information can also include linked data objects 130. The linked data objects 130 can be any information associated with a data object, including information linking two or more data objects. For example, the linked data objects can include one or more of information relating to events, time-series data, other types of data or information (e.g., that generated by a sensor, a user, or a process), associations, batches, sensors, and the like.

During data analysis, some or all of the information in each set of data objects can be grouped into subsets of data objects based on a user's input during a data analysis session, and information related to a subset of data objects can be shown on the user interface 600 for further analysis. For example, based on a user's input selecting a portion of the information in the first set of data objects 110A, the user can drill-down into the first set of data objects 110A segregating a portion of the information into a first subset of the first set of data objects 115A.

During data analysis, the analysis system 150 can, based on a user input, further segregate a portion of the information in the first set of data objects 110A into a second subset of the first set of data objects 120A. In various analysis workflows, the second subset of the first set of data objects 120A may include some of the information in the first subset of the first set of data objects 115A, or it may include different information, that is, information that is in the first set of the data objects 110A but not in the first subset of the first set of data objects 115A. Similarly, a user can then further segregate a portion of the information in the first set of data objects 110A into one or more other subsets of information, illustrated in FIG. 1 as a Nth subset of the first set of data objects 125A. Similar analysis workflows can be performed on other sets of data objects, for example, a second set of data objects 110B, and the second set of data objects 110B can be similarly segregated into one or more subsets, e.g., a first subset of the second set of data objects 115B, a second subset of the second set of data objects 120B, and an Nth subset of the second set of data objects 125B.

The data analysis system 100 is configured with software applications and user interfaces provide an object-orientated methodology for sequentially analyzing a set of objects that includes time-series and/or non-time-series data (collectively "data"). An object-centric user interface supports initial selection of a group of data objects, the types of which are defined by an ontology. In an example workflow, a user can generate a visualization based on the group of data objects. The visualization can be generated using tools provided on the object-centric user interface, as described in the examples in FIGS. 6-8. For example, that display objects in a table, a list, a bar chart or other types of plots. The user can then "drill down" on a subset of the group of data objects via a selection in the visualization and using filtering tools and linked object tools, to create a new selection or group of data objects, which may be a subset of the original group of data objects. This can optionally be repeated as desired to continue to drill down into the group of objects. The user interface can also produce plots showing data related to selected data objects. By selecting a portion of the data, further drill-down or segregation into the group of data objects can be performed. In other examples of a data analysis workflow, a group of data objects is selected and "linked objects" to an object(s) in the group of objects are identified, thereby creating a selection of one or more new groups of data objects. The "linked object" functionality, or another tool, can optionally be repeated as desired to further drill down into the group of objects.

Figure 8:
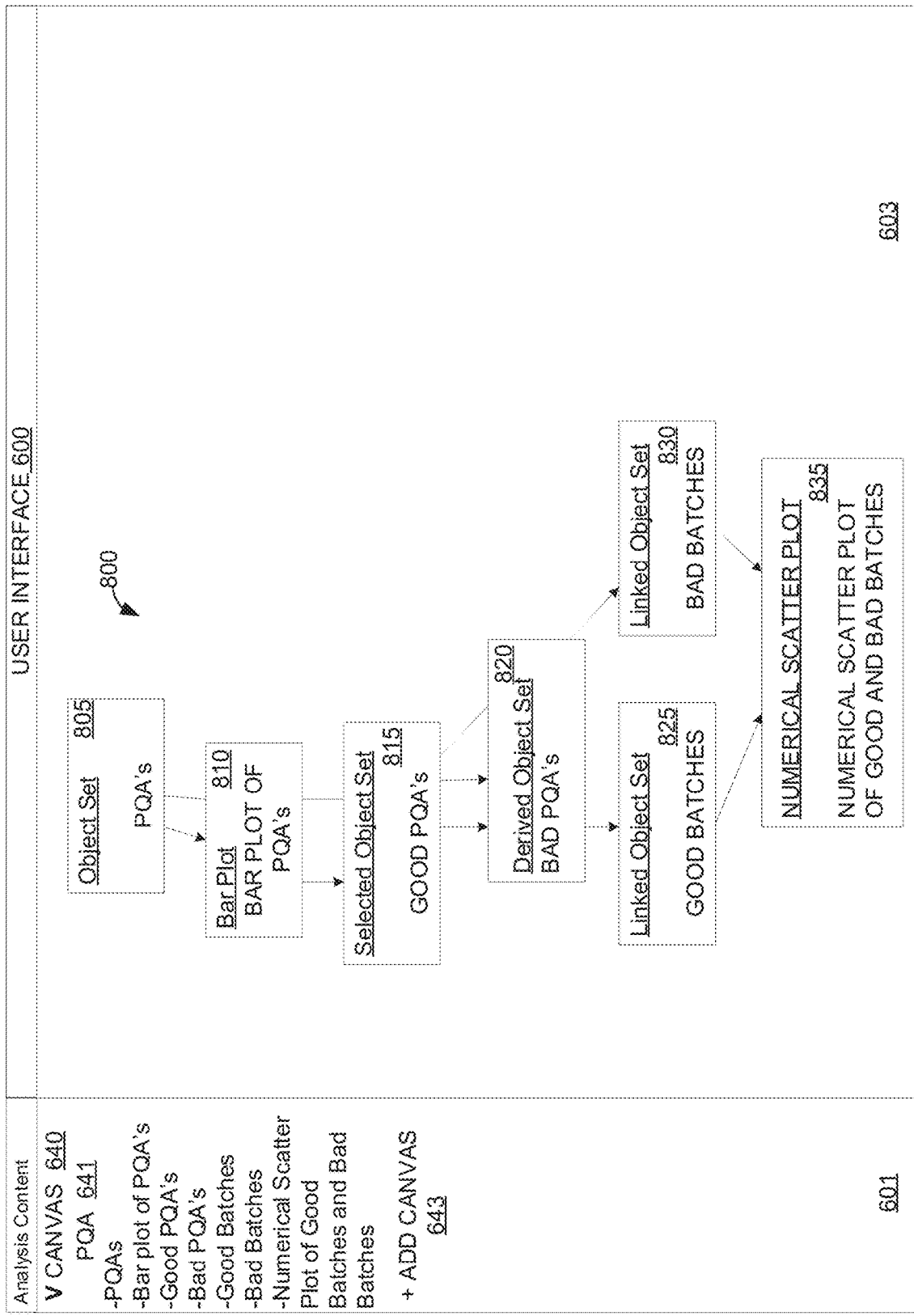
FIG. 8 illustrates a graphical depiction of the object-centric analysis illustrated in FIGS. 6A-6E and 7A-7D, graphical depiction allowing a user to view the object-centric flow of the current analysis, and select a step on the flow for further analysis.

The analysis system 150 is also configured to generate and display, on the user interface 600, a "Graph View" depicting a representation of the operations (selections, filtering, etc.) conducted by the user on the data objects, e.g., as illustrated in FIG. 8. Once an analysis is completed for an initial set of data objects, the user may further select a new set of data objects and apply some or all of the operations in the Graph View to the new data objects. The provenance of the sequential analysis performed in a workflow is maintained by the Graph View. A user may edit the analysis at any point in the workflow, causing automatic downstream updates of operations that are performed on the data objects. In an example, if new data objects are selected, the operations performed on the previously selected objects are performed on the new data objects. In another example, if one or more operations are changed by a user at one point in the workflow, corresponding changes are made downstream (e.g., subsequent operations) in the workflow, the corresponding changes based at least in part on the one or more operations changed by the user.

The object-centric interaction user interface offers many advantages. It increases efficiency of finding objects for further analysis in a set of objects, allows objects to be visualized in different ways, allows drill-down into objects that are associated in the selected set of objects, allows various analysis of data objects through certain "unions" and "intersections" of selected objects. The object-centric user interface may also display time-series or non-time-series data of any of the object results. While time-series data is not always associated with an object, when it is displayed portions of the time-series data can be selected for further analysis of related objects.

Figure 2:
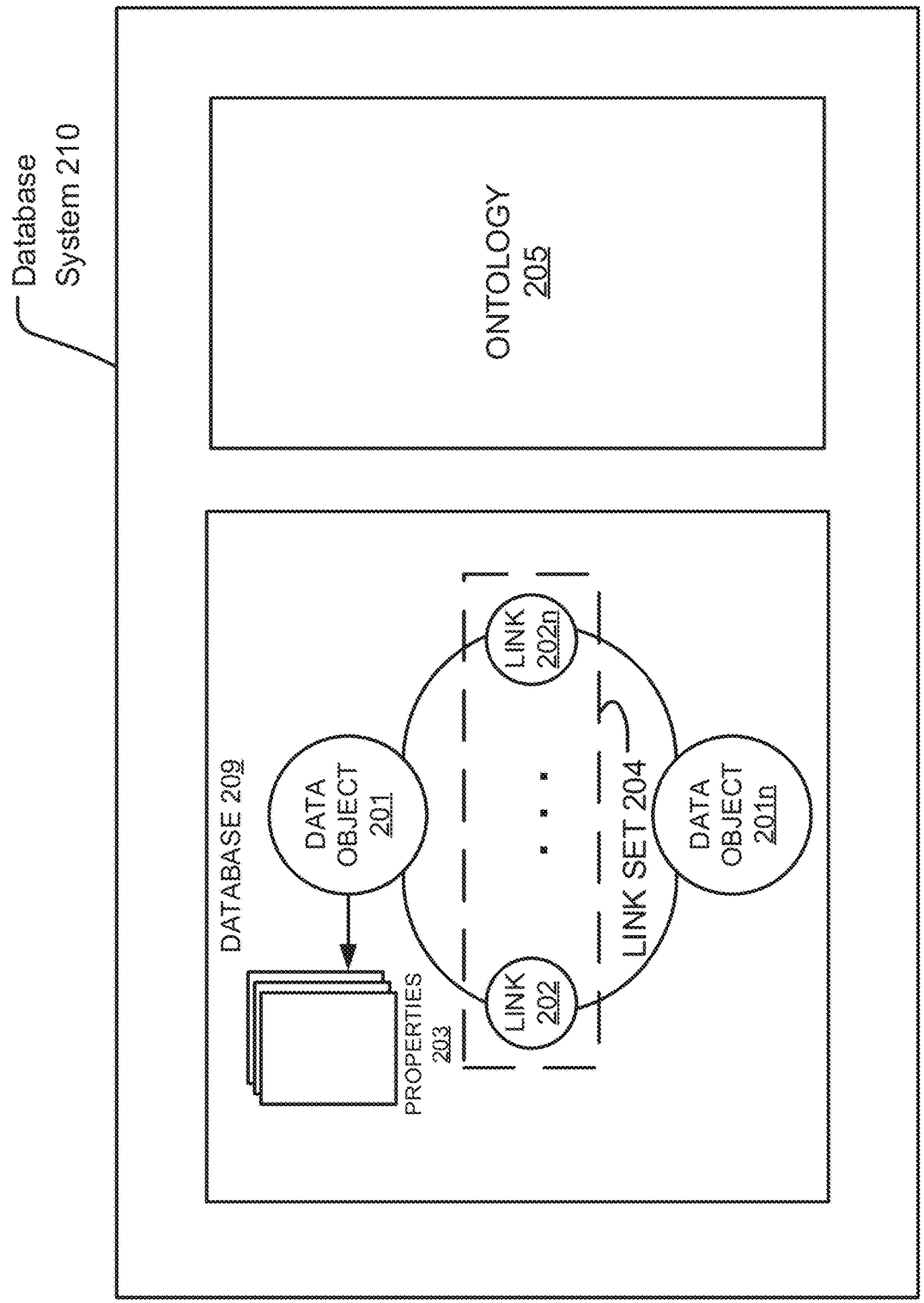
FIG. 2 illustrates one embodiment of a database system using an ontology.
Figure 3:
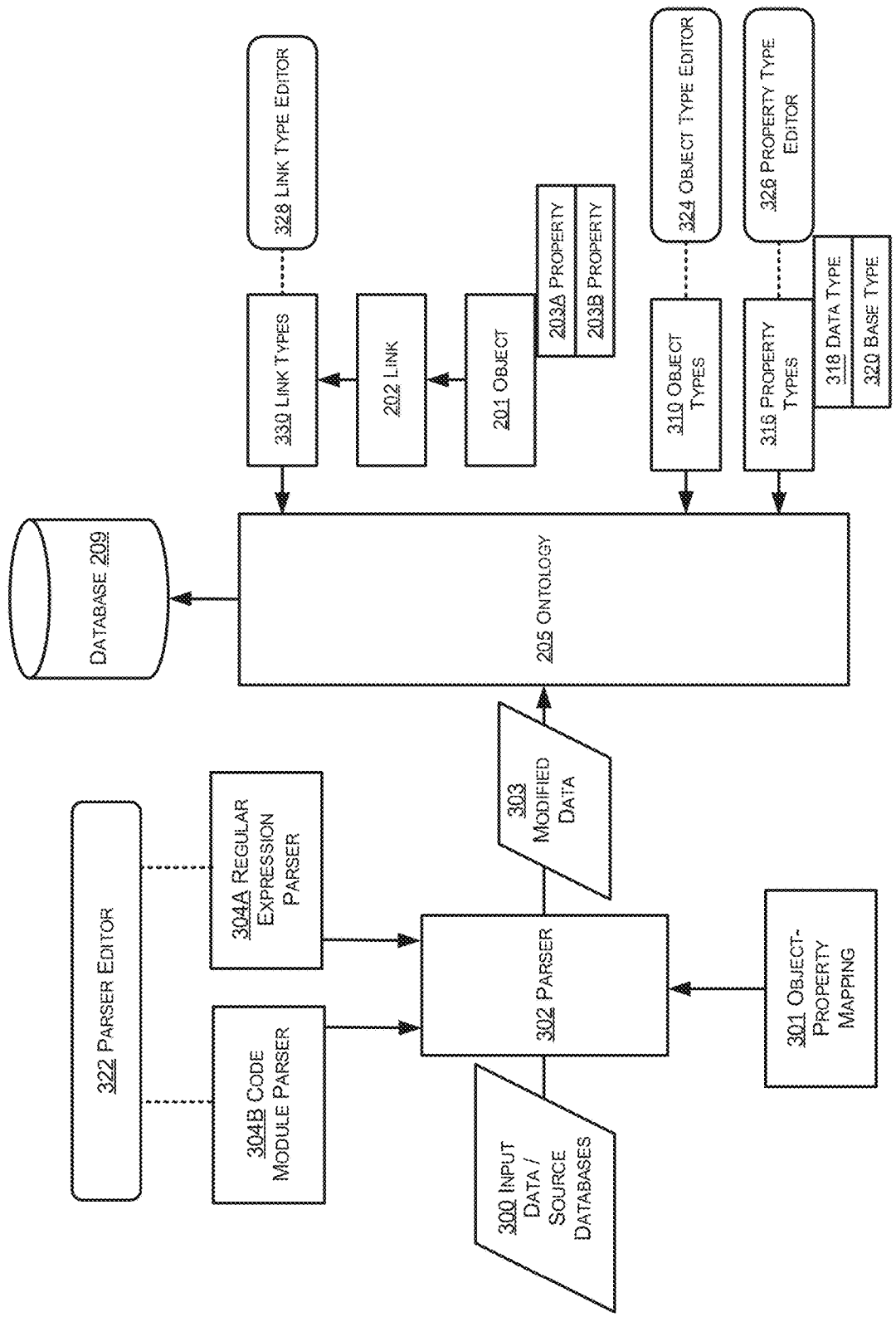
FIG. 3 illustrates one embodiment of a system for creating data in a data store using a dynamic ontology.

The data objects 105 can be stored in one or more databases in accordance with one or more data models, as described in more detail in reference to FIGS. 2 and 3. For example, time-series or non-time series data may be stored in a type of data object in accordance with an object definition that includes how the data is related to other objects. Data objects may be defined in various ways depending on a particular implementation to facilitate analyzing and comparing the generated data. For example, each of the batches may be stored as a data object that includes a batch identifier, the batch start time, the batch end time, and identifiers for one or more events that are associated with the batch. In another example, each data stream generated by a sensor may be stored as a data object, in such a data object may include a sensor identifier, a system identifier indicating what system the sensor is associated with, the sensed data generated by the sensor, and time information corresponding to the sensed data generated by the sensor. In another example, time-series and/or non-time series data that includes user indicated quality data may be stored as a data object that includes a batch identifier, a system identifier, quality data, and time information corresponding to the quality data provided by the user. In another example, time-series and/or non-time series data that includes determined information may be stored as a data object that includes a batch identifier, system identifier, quality data, and time information corresponding to the determined information.

In an implementation, the system 100 (or one or more aspects of the system 100) may comprise, or be implemented in, a "virtual computing environment." As used herein, the term "virtual computing environment" should be construed broadly to include, for example, computer readable program instructions executed by one or more processors (e.g., as described in the example of FIG. 4) to implement one or more aspects of the modules and/or functionality described herein. Further, in this implementation, one or more components of the system 100 may be understood as comprising one or more rules engines of the virtual computing environment that, in response to inputs received by the virtual computing environment, execute program instructions to modify operation of the virtual computing environment. For example, a request received from the user computing device may be understood as modifying operation of the virtual computing environment to cause the request access to a resource from the system 100. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system 100. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system 100 as a virtual computing environment may advantageously enable executing different aspects or modules of the system on different computing devices or the system 100 as a virtual computing environment may further advantageously enable sandboxing various aspects, data, or modules of the system from one another, which may increase security of the system by preventing, e.g., malicious intrusion into the system from spreading. Implementing one or more aspects of the system 100 as a virtual computing environment may further advantageously enable parallel execution of various aspects or modules of the system, which may increase the scalability of the system. Implementing one or more aspects of the data the system 100 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

FIG. 2 illustrates one embodiment of a database system using an ontology. An ontology may provide a data model for storage of time-series and/or non-time series data and data object information, for example, as described in reference to FIGS. 1, 4, and 6-8. To provide a framework for the discussion of specific systems and methods described herein, an example database system 210 using an ontology 205 will now be described in reference to FIG. 2. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

FIG. 2 also illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined by the ontology 205. In another example of an event object, a batch (e.g., an object of type "batch") in a process step or location in the process (e.g., a property of type "event") starting on Mar. 27, 2009 (e.g., a property of type "date") at 0805:00 (e.g., a property of type "start time") and completing on Mar. 27, 2009 (e.g., a property of type "date") at 1515:15 (e.g., a property of type "time") on (or monitored by) system 1 (e.g., a property type of "system"). In another example, a specific sensor (e.g., an object of type "sensor") used in a system (e.g., a property of type "system") can collect time-series and/or non-time series data (e.g., a property of type "data") along with times associated with the data (e.g., a property of type "time"). The data objects defined in the ontology 205 may support property multiplicity. In particular, a data object 201 may be allowed to have more than one property 203 of the same property type. For example, a "Person" data object might have multiple "Address" properties or multiple "Name" properties. In another example, a batch in a process run may have multiple "sensor" properties indicating that multiple sensors collected monitored the batch to collect data.

Each link 202, 202n represents a connection between two data objects 201, 201n. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. In one embodiment, when two data objects are connected by an event, they may also be connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In another example, two "Batch" data objects representing two batches that were monitored by the same system may both have a "Sensor" property that indicates the sensor that was used to monitor each of the batches. If both batches were monitored by the same system (e.g., at different times), then both batches may have one or more "Sensor" properties that are likely similar, if not identical, indicating one or more of the same sensors were used to collect time-series and/or non-time series data for each of the batches. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document. Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. In another example, a system performing a process may be in communication with one or more databases with information about sensors that monitor the process and phases of the process. The databases may contain a variety of related information and attributes of each type of data, for example, related to multiple sensors that collect data during the process, phases of the process, data sensed by a sensor, time stamps of sensor data, and corresponding information related to the process or particular phases of the process. The parser 302 is able to read a variety of source input data types and determine which type of data it is reading.

In accordance with the discussion above, the example ontology 205 comprises stored information providing the data model of data for storage of data in database 209. The ontology 205 stored information provides a data model having one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203A, 203B that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 426 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

A user interface may show relationships between data objects. Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, a user interface may allow various other manipulations. For example, the objects within a database 209 may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. For example, by performing one or more filtering and/or aggregation functions on the data represented by the objects, some sort of time-varying baseline may be generated, indicative of expected data with respect to time, from which erroneous data can be detected either manually or automatically, for example with respect to a predetermined or default outlier conditions.

Advantageously, the present disclosure allows data objects, to be indexed in an object-centric and more useful way allowing users to interact and analyze electronic data in a more analytically useful way and/or for computation analysis to be performed in a more useful way, for example to detect conditions requiring attention. In various implementations of analysis data objects can include time-series sensor data. Graphical user interfaces (e.g., as illustrated in FIGS. 6-7) allow a user to visualize otherwise difficult to define relationships and patterns between different data objects. The present disclosure also allows faster analysis of data by allowing quick and accurate access to selected portions of sensor data which may have been collected by different sensors in different systems, or the same sensors of the same system but during different processes of a repetitively run process. Without using the present disclosure, quickly selecting, filtering, displaying, and analyzing linked objects and data, and making use of known relationships associated with time-series and/or non-time series data, would be virtually impossible given the size and diversity of many users' present databases.

A dynamic ontology can be defined for use in creating data in a database. For purposes of disclosing a clear example, operations that may be used to define a dynamic ontology are first described at a high level, and details of an example implementation follow the high level description. Although the operations may be referred to herein as "steps," unless indicated otherwise, these operations may be performed multiple time, for example, as loops. Also, in an embodiment, these operations may be performed in a different order, and/or there may be fewer operations or less operations. One or more object types are created for a database ontology. One or more property types are created for each object type. The attributes of object types or property types of the ontology may be edited or modified at any time.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. Example selected attributes that can be displayed in object editor panel include an object type name (e.g., Business, Asset, etc.), a uniform resource identifier (URI) specifying a location of information defining the object type (for example, "com.business_entity_name.object.business"), and a base type of the object type, also expressed in URI format (for example, "com.business_entity_name.object.entity"). Each URI also may include a graphical icon.

In an embodiment, a user interacts with a computer to perform the following steps to define an object type. Assume for purposes of an example that the new object type is Batch. Using the object type editor, the user selects the "Add Object Type" button and the computer generates and displays a panel that prompts the user to enter values for a new object type. The user selects a base object type of Entity, which may comprise any person, place or thing. The user assigns a graphical icon to the Batch object type. The user assigns a display name of "Batch" to the object type.

In an embodiment, a user interacts with the computer to define a property type in a similar manner. For example, the user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property.

In various embodiments, validators may comprise regular expressions, a set of fixed values, or a code module. For example, a property type that is a number may have a validator comprising a regular expression that matches digits 0 to 9. As another example, a property type that is a US state may have a validator that comprises the set {AK, AL, CA . . . VA} of valid two-letter postal abbreviations for states. Validator sets may be extendible to allow a user to add further values. A property type may have component elements, and each component element may have a different validator. For example, a property type of "Address" may comprise as components "City", "State", and "ZIP", each of which may have a different validator. In an embodiment, defining a property type includes identifying one or more associated words for the property type. The associated words support search functions in large database systems. For example, a property type of "Address" may have an associated word of "home" so that a search in the system for "home" properties will yield "Address" as one result.

In an embodiment, defining a property type includes identifying a display formatter for the property type. A display formatter specifies how to print or display a property type value. In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Creating a parser definition for a property type may comprise selecting a parser type such as a regular expression, code module, or other parser type. When the parser type is "code module," then a user specifies the name of a particular code module, script, or other functional element that can perform parsing for the associated property type. In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display may further comprises a Name text entry box that can receive a user-specified name for the parser definition. When the parser type is "regular expression," regular expression text is specified. For example, when the Parser Type value of combo box is "Regular Expression," a screen display comprises an Expression Pattern text box that can receive a user entry of regular expression pattern text.

A property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. Specifying a property type component and sub-definition of regular expression text may be repeated for all other property type components of a particular property type.

A user may specify one or more constraints, default values, and/or other attributes of a parser definition. The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified. The parser definition is stored in association with a property type. For example, selecting the SAVE button causes storing a parser definition based on the values entered in screen display. Parser definitions may be stored in database 209.

Advantageously, use of a dynamic ontology may allow a user to take advantage of an ontological data model, while not constraining himself or herself to a hard-coded ontology. Hard-coded ontologies can be overly simple (i.e., lacking detailed semantic properties, making classification difficult but limiting analysis) or overly complex (i.e., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

In various implementations, data objects associated in an ontology stored in a database may be stored as graphs or graph-like relationships (which may comprise data structures or databases), referred to collectively as "graphs." As described here, various data items may be stored, processed, analyzed, etc. via graph-related data structures, which may provide various storage and processing efficiency advantages described. For example, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc.

The nodes of a graph may represent different information or data objects, for example. The edges of the graph may represent relationships between the nodes. The ontology may be created or updated in various ways, including those described herein, comprising both manual and automatic processes. In some implementations, the ontology and or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (i.e., node list) representation.

Figure 4:
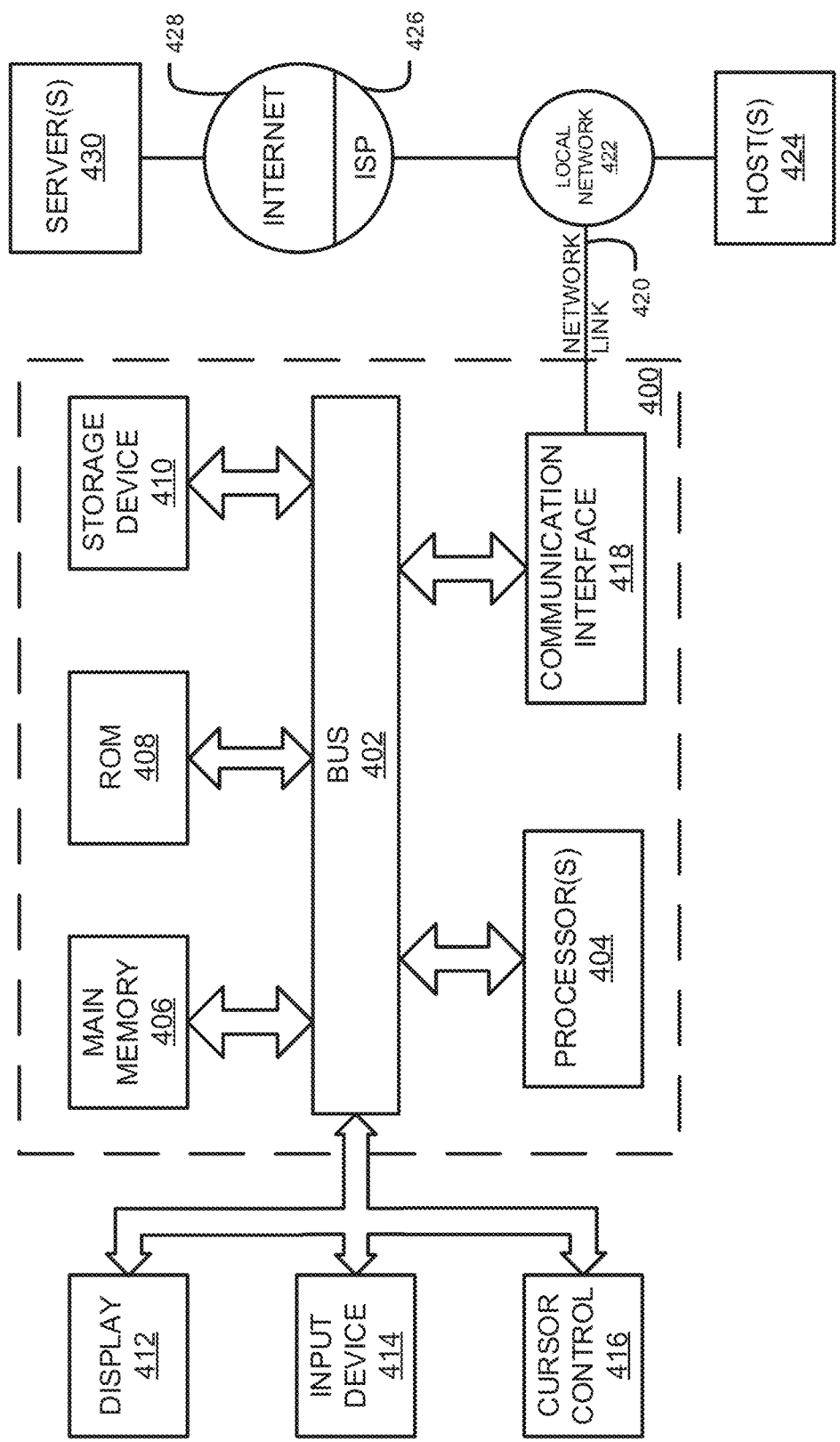
FIG. 4 illustrates a computer system with which certain methods discussed herein may be implemented.

FIG. 4 illustrates a computer system with which certain methods discussed herein may be implemented. Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions. The main memory 406 may, for example, include instructions to allow a user to manipulate time-series and/or non-time series data to store the data in data objects as defined by an ontology, as described in reference to FIGS. 2 and 3.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as computer executable program instructions that are executed by the computing device(s). Computer system 400 may further, implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more computer readable program instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

Various forms of computer readable storage media may be involved in carrying one or more sequences of one or more computer readable program instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicate with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. Accordingly, in some embodiments, of the computer system 400, the computer system comprises one or more non-transitory computer storage mediums configured to store at least a plurality of sets of data objects including a first set of data objects and a second set of data objects, the data objects in the plurality of sets of data objects including links to other data object, and computer-executable instructions. The computer system can further comprise one or more computer hardware processors 404 in communication with the second non-transitory computer storage medium main memory 406, the one or more computer hardware processors 404 configured to execute the computer-executable instructions to at least: present the plurality of sets of data objects in a selectable format on a display device, receive a user selection of the first set of data objects, generate a user interface comprising a visualization of the first set of data objects and a plurality of selectable tools configured to select and present on the user interface aspects of the first set of data objects, receive user selections of one or more of the tools to cause respective one or more operations to occur on the first set of data objects in an analysis session for the set of data objects, update the user interface to comprise a first visualization based on the one or more operations performed on the first set of data objects in the analysis session, receive a user selection of the second set of data objects, receive a user selection to cause application of the one or more operations to the second set of data objects, and update the user interface to comprise a second visualization based on the one or more operations performed on the second set of data objects. Each of the set of data objects can include time-series and/or non-time series data. The one or more computer hardware processors can be further configured to execute the computer-executable instructions to generate and display on a user interface a graph depicting information on the one or more operations that have been performed on the first set of data objects, the graph including a plurality of nodes, each of the plurality of nodes representing a respective operation of the one or more operations that has been performed on the first set of data objects. Each node of the graph includes information indicating any respective child node of said each node. The one or more computer hardware processors are further configured to execute the computer-executable instructions to receive a user selection indicating a change of at least one data object of the first set of data objects to create a changed first set of data objects, receive a user selection to cause the application of the one or more operations to the changed first set of data objects, the application of the one or more operations to the changed first set of data objects being the same operations that were previously performed on the first data set of objects, and update the user interface to comprise a third visualization based on the one or more operations performed on the changed first set of data objects.

The computer system 400 can include many other aspects. In an embodiment, the one or more computer hardware processors 404 of the computer system 400 are further configured to execute the computer-executable instructions to present a plurality of sets of data objects in a selectable format on a display device 412, receive a user selection of a first set of data objects of the plurality of data objects, generate a user interface comprising a visualization of the first set of data objects and a plurality of selectable tools configured to select and present on the user interface aspects of the first set of objects, receive user selections from user input device 414 of one or more of the tools to cause respective one or more operations to occur on the first set of data objects in an analysis session for the set of data objects, updating the user interface to comprise a first visualization based on the one or more operations performed on the first set of data objects in the analysis session, receiving a user selection of a second set of data objects of the plurality of data objects, receiving a user selection to cause application of the one or more operations to the second set of data objects, and updating the user interface to comprise a second visualization based on the one or more operations performed on the second set of data objects, Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
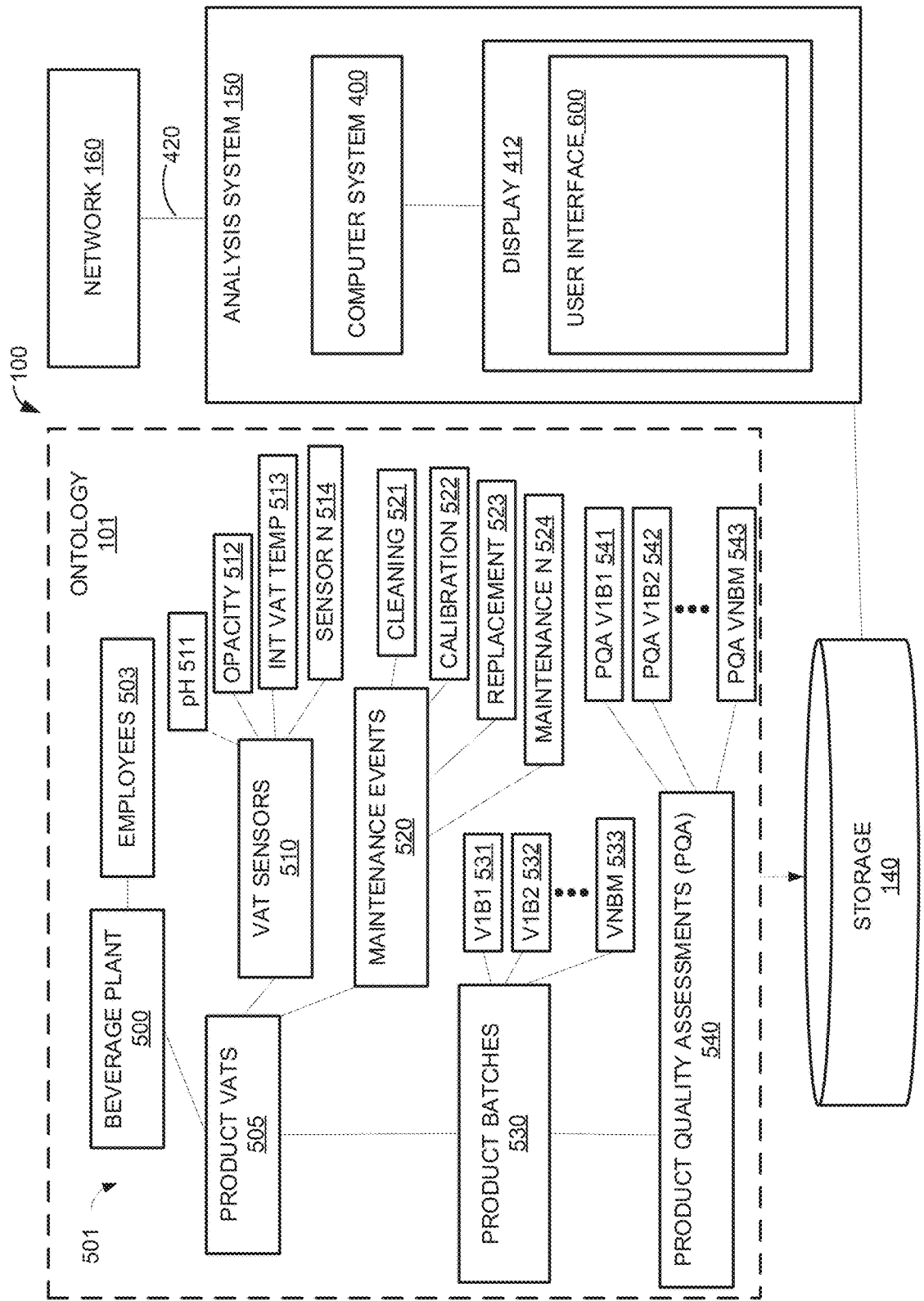
FIG. 5 illustrates an example of the system of FIG. 1 where the data relates beverage plant information that is represented in data objects defined by an ontology, the data objects stored on one or more storage devices and linked to other data objects, the data storage system in communication with an analysis system configured for analyzing the stored data in an object-centric methodology.

FIG. 5 illustrates an example of the system of FIG. 1, where the data objects relate to information for generating a beverage in a facility (e.g., beverage plant information). The data objects are stored on the storage device 140. An analysis system 150 is in communication with the storage device 140 and is configured for users to perform data analysis of the beverage plant information. The example illustrated in FIG. 5 depicts a number of data objects defined by an ontology (e.g., product vats, vat sensors, product batches, maintenance events, product quality assessments, etc.) and is only one illustrative example of information that can be analyzed for purposes of describing the system and methods for analyzing information Other similarly configured systems may be used for data analysis of a much larger amount of information with a greater number of data objects and associations/links. In an example, data analysis may be performed on information that includes some or all of the thousands of companies on the NASDAQ exchange and/or New York Stock Exchange, each company being linked to tens or hundreds of other objects. For example, the company's stock opening price, closing price, and volume each day (or each hour) for days, months or years, other daily/monthly financial information (e.g., sales information by store or region), news events related to the company, etc.

A graphical depiction 501 of certain beverage plant information is shown in FIG. 5. The functionality of the system described allows a user to analyze information from a graphical object-centric viewpoint, drilling down into a first set of data objects and their linked objects to segregate desired information into one or more subsets of the data objects using a defined sequential methodology, and display such information in one or more time-series and/or non-time series data plots. Once a sequential analysis methodology is defined, the use can re-define an upstream portion of the sequential analysis methodology (e.g., by selecting one or more different data objects or operations) and all of the downstream processing will be re-applied from the re-defined portion down. The system then allows the user to pivot to select a second set of data objects and apply the same defined methodology to the second set of data objects. The graphical depiction 501 is a representation of at least a portion of the data objects that can represent the beverage plant information, and illustrates an example of data objects that can be analyzed, such as the example analysis described in reference to FIGS. 6A-E and 7A-D. Each of the boxes in the graphical depiction 501 represent data objects of the beverage plant information, and the lines between the data objects represent links (associations) between the data objects. In this example, the beverage plant information is represented by a beverage plant data object 500 linked to employee data objects 503 and product vat data objects 505. The product vat data objects 505 are linked to a plurality of vat sensor data objects 510, including, a pH sensor data object 511, an opacity sensor data object 512, an interior vat temperature data object 513, and a sensor N data object 514 (which represents one or more other sensor data objects). Each of the sensor data objects can be data representing senses samples for the particular sensor over a time period.

The product vat data objects 505 are linked to a plurality of maintenance events data objects 520, including a cleaning data object 521 (indicating, for example, when a particular vat was cleaned), a calibration data object 522 (indicating, for example, when one or more of the sensors were calibrated), a replacement data object 523 (indicating, for example, when one or more of the sensors were replaced), and a maintenance N data object 524 (indicating, for example, when one or more maintenance actions occurred). The product batch data object 505 is also linked to product batches data object 530, which represent particular batches of beverages that were produced in the beverage plant. For example, vat 1 beverage 1 (V1B1) 531, vat 1 beverage 2 (V1B2) 532 . . . vat n beverage m (VNBM) 533. The product batches data object 530 is also linked to product quality assessments ("PQA's") 540 having information on the quality of each of the batches of beverages produced. For example, a PQA VIB1 541 (representing a PQA associated with vat 1 beverage 1), PQA V1B2 542 (representing a PQA associated with vat 1 beverage 2), and PQA VNBM 543 (representing a PQA associated with vat n beverage m).

FIGS. 6A, 6B, 6C, 6D, 6E, 7A, 7B, 7C, and 7D illustrate various examples of a user interface 600 that may be generated and displayed during a data analysis workflow of the beverage plant information illustrated in FIG. 5.

FIG. 6A illustrates an example of a user interface 600 illustrating the selection of a first set of data objects based on a user input. The user interface 600 can have one or more panels that show information related to data objects including tables, lists, and plots of one or more data objects. As a user performs an analysis workflow, the user interface 600 depicts information related to the workflow on one or more panels of the user interface 600. In FIG. 6A the user interface is shown having three panels, an analysis content panel 601, in editor panel 603, and a canvas panel 603. The analysis content panel 601 can be configured to display a list that shows what data objects are selected and what is being displayed on the canvas panel 603 (an example as illustrated in FIG. 6C). In this example, the analysis panel indicates in a field the data objects PQA 641, a list of items on the canvas 640, allows a user to select a new chart 642, and allows a user to select a new canvas 643. The editor panel 602 at this point shows that there are 411 results for the PQA data objects in field 644, and a list of the PQA's. The canvas panel 603 shows a list of selectable object sets in a list of objects 646, and indicates that the system has received user input selecting the PQA data objects as a starting point for the analysis (i.e., as a first set of data objects), and this resulted in 411 PQA data objects.

FIG. 6B illustrates an example of a user interface 600 graphically presenting the selected set of 411 PQA data objects 605 and a palette of tool icons (tools) that, when selected, display aspects of the selected set of data objects and analyzing the set of data objects. The selection of one of the tools can cause the user interface to display information and input fields for using the tool. In the example illustrated in FIG. 6B, the palette of tools includes Table 610, List 615, Bar Plot 620, All Plots 625, Linked Objects 630, and Filter 635. The tool Table 610 causes generates and causes a display of the PQA data objects 605 in a table that can also show various information related to each of the 411 PQA data objects 605. The tool List 615 causes generates and causes a display of the PQA data objects 605 in a list. The tool Bar Plot 620 generates and causes a display of the PQA data objects 605 in a bar plot. In an example, each of the PQA data object related to a certain batch of a beverage is on the Y-axis and a selected PQA data related to each PQA data object is on the X-axis (e.g., pH, opacity, user taste assessment, color, etc.). Bar Plot 620 can be used to quickly generate a bar plot of the selected data objects where the user only has to select the information for one or the axis of the plot, and the "bars" can be aligned to be vertical columns or horizontal bars by a user selection. The tool All Plots 625 generates and causes display of the PQA data objects 605 in a number of different user configurable plots, e.g., a variety of complex bar plots, pie charts, scatter plots, and the like. The tool Linked Objects 630 generates and causes display of objects that are linked to the PQA data objects 605. For some data objects that are the selected data objects, there may be a few linked objects, while in other analysis it may be dozens, hundreds, thousands, or more linked objects. The linked objects can include time-series data objects and/or non-time-series data objects (e.g., any other types of objects). The tool Linked Objects 630 can be used iteratively, to display linked objects to a selected object, and then one of the displayed linked objects can be selected and the tool Linked Objects 630 can be used to display objects linked to that object, etc. The results of using any of these tools is a graphical display of information that can be selected to allow further drill-down/segregation of the data into subsets of data objects for further analysis.

FIG. 6C illustrates an example of the user interface 600 displaying a selected set of PQA data objects, tool options, and a plot 660 of the set of PQA data objects 605 that was generated based on a user input selection indicating how to group the plotted PQA data. In this example, on the user interface 600, the analysis content panel 601 indicates that the canvas panel 603 is has been configured to display the PQA data objects 605 with a tool palette, and also to display a plot 660 of the PQA data objects to provide the user insight on the associated rating of the PQA data objects. The plot 660 is generated and presented on the canvas panel 603 based on user input that defines how the PQA data objects should be grouped, which the user can enter in the editor panel 602. In this example, the PQA data objects 605 are grouped by a quality assessment "rating" of 1-10 where "1" is the lowest quality rating and "10" is the highest quality rating. In this example, of the 411 PQA data samples (i.e., data objects), 24 PQA data samples have a rating of "10", 156 PQA data samples have a rating of "9", 116 data samples have a rating of "8", etc.

Figure 6D:
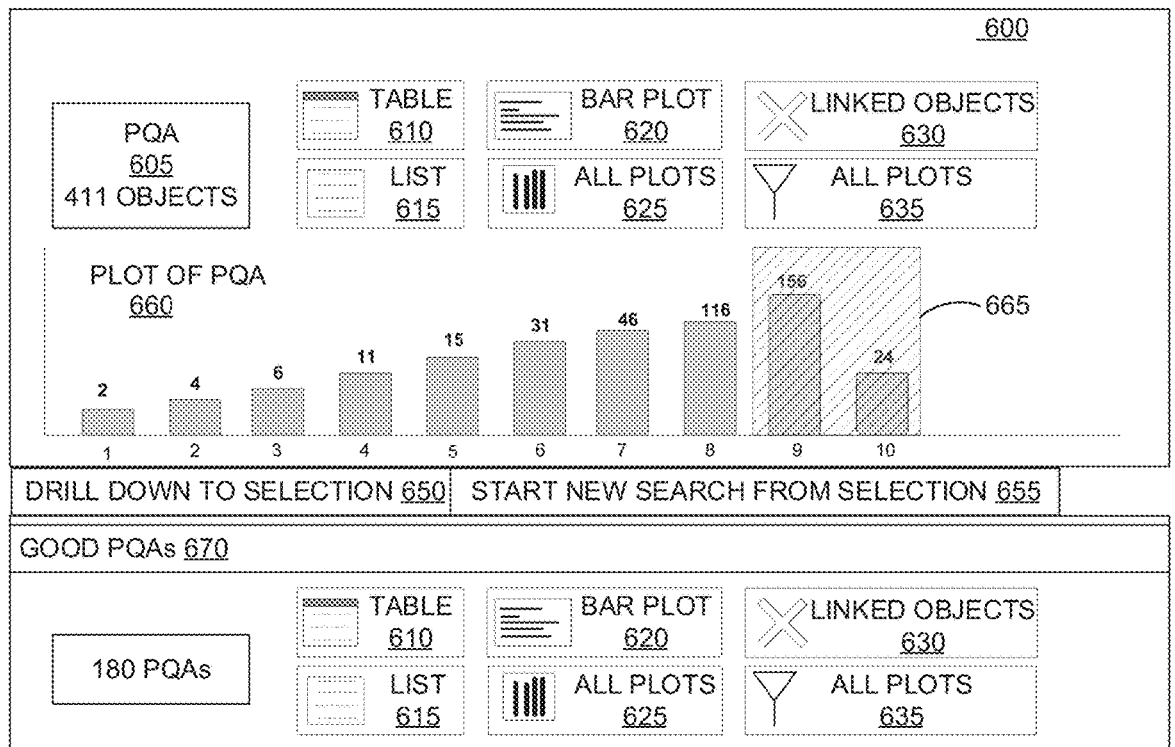
FIG. 6D illustrates an example of a user interface presenting a selected set of data objects and options presented on a user interface, and a plot of the set of data objects showing the selection of a subset of the presented set of data objects that can be graphically selected by a user on the user interface.

As illustrated in FIG. 6D, starting with the PQA data objects 605, the user can create a subset of the PQA data objects 605 by selecting a portion of the PQA data objects displayed on the PQA data object plot 660. Selecting a portion of the PQA data can be done graphically by selecting objects on the plot, for example, by drawing a minimum bounding rectangle 665 around the two highest rating bars on the plot, the ratings of "9" (158 data objects) and the rating of "10" (24 data objects). In other examples, the selection of the data in the plot may be done by clicking on the bars themselves. The selection of the data objects with the two highest ratings is then defined to be the "Good PQA" data objects having 180 samples. The user interface allows a user, having started with a first set of data objects, to graphically select a portion of the first set of data objects to then drill-down into the selected portion of the first set of data objects for further analysis. The user interface 600 is configured to have several tools to help a user analyze selected data. For example, the user interface 600 includes a "drill down to selection" 650 option that allows the user to then apply any of the tools 610, 615, 620, 625, 630, 635 to further determine and display information related to the set of data objects Good PQA's 670. The user interface 600 is also configured with the option to receive a user input to "start a new search from a selection" 655, which can allow new search is to be conducted using the selected data (i.e., having a rating or "9" or "10") as the data to conduct a search from.

Figure 6E:
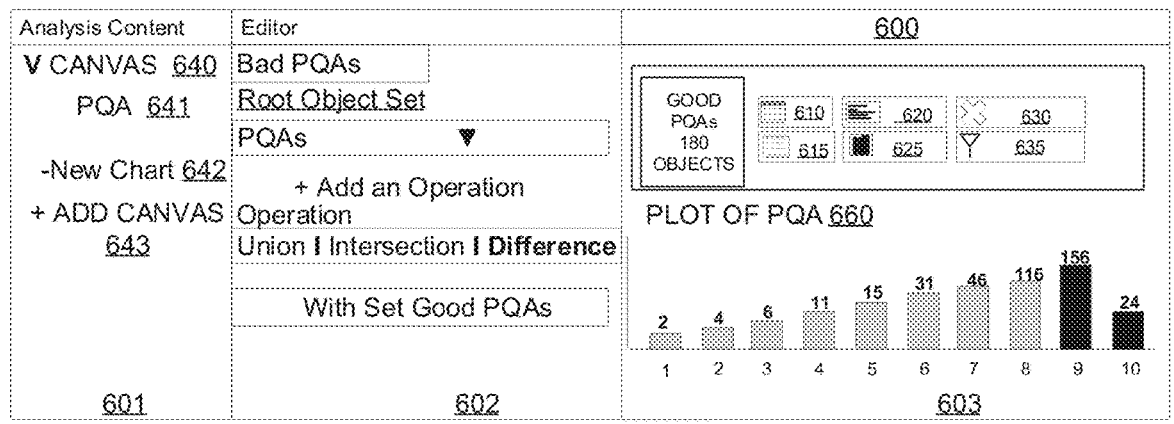
FIG. 6E illustrates an example of a user interface presenting a selected set of data objects and options presented on a user interface, and also illustrating creation of another subset of objects that is based on a relationship (e.g., a "DIFFERENCE") between the first subset of data objects and the first set of data objects.

FIG. 6E illustrates an example of a user interface presenting the selected set of data objects illustrated in FIG. 6D and options presented on a user interface 600, illustrating creation of another subset of objects ("Bad PQA's") that is based on a relationship (e.g., a "Difference") between a first subset of data objects (Good PQA's 670) and the first set of data objects (PQA's 605). The editor panel 602 can present options to start with a root object set (i.e., PQA's) and then perform an operation between the root object set and the selected object set, in this example the Good PQA's. The operations may be, for example, to create a new data set being, for example, (i) the union of a first indicated data set and a second indicated data set, (ii) the intersection of a first indicated data set in a second indicated data set, or (iii) the difference between a first indicated data set and a second indicated data set. In this example, having defined a subset of data objects as good PQA's 670 from the total PQA data objects 605, a second subset of data objects (the Bad PQA data objects) can be defined by determining the difference between the set of the total PQA data objects 605 and the set of the Good PQA data objects 670, and the resulting set of Bad PQA's of 231 data objects (or data samples) can be displayed, as illustrated in FIG. 7A.

Figure 7A:
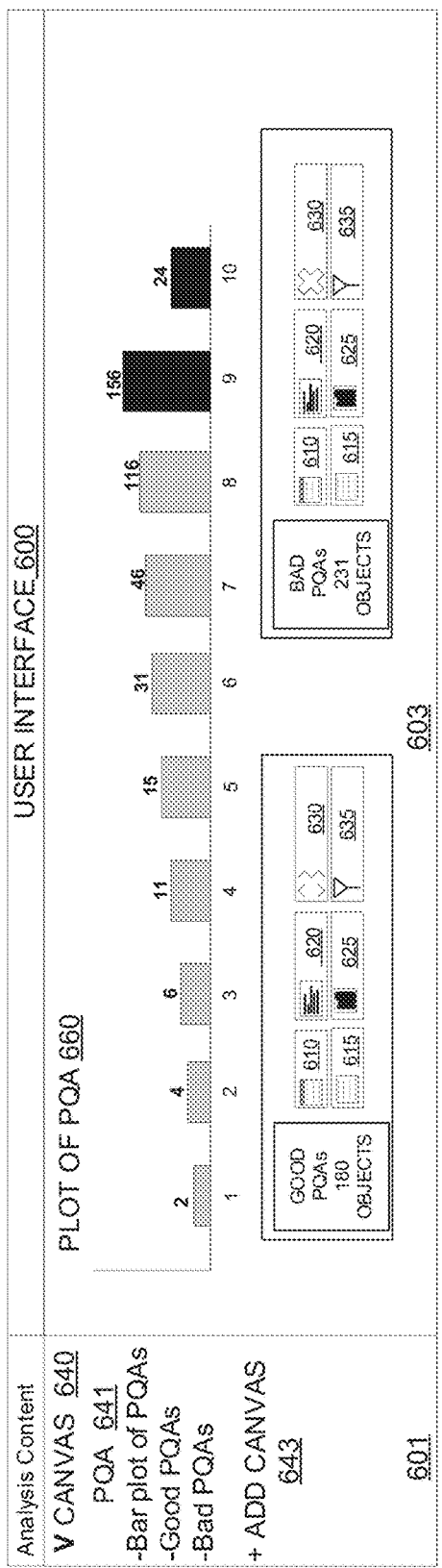
FIG. 7A illustrates the first and second subset of data objects and a corresponding plot presented on the user interface, the plot illustrating the selection of the two subsets of data objects.
Figure 7B:
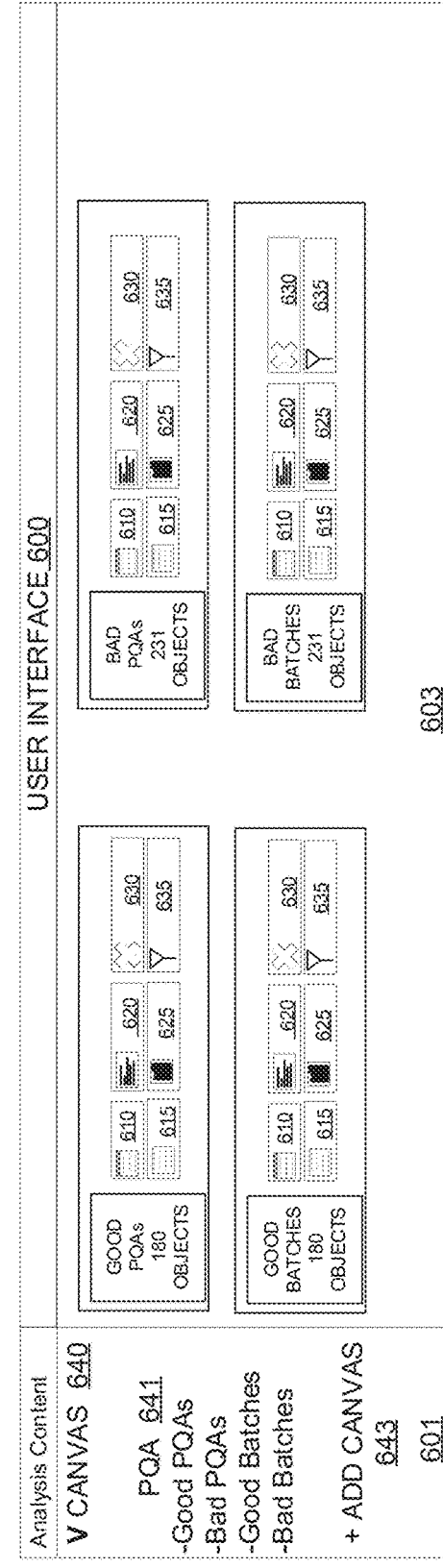
FIG. 7B illustrates the first subset of PQA data objects and a corresponding linked set of good batches of PQA data objects, and second subset of PQA data objects and a corresponding linked set of bad batches of PQA data objects.
Figure 7C:
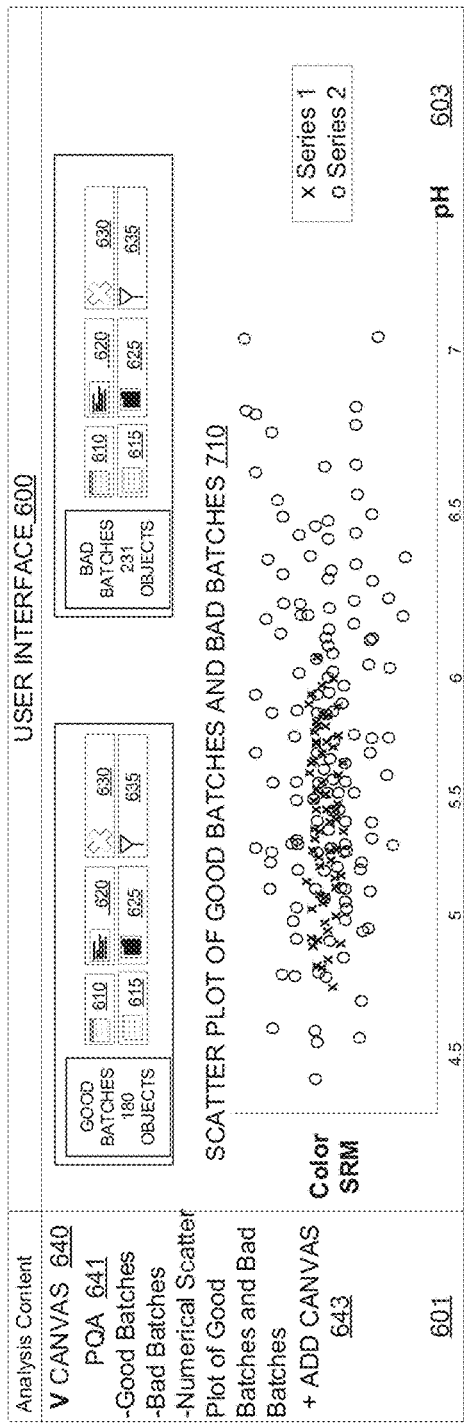
FIG. 7C illustrates the first subset of PQA data objects the second subset of PQA data objects, and a corresponding scatter plot of time-series data of the two subsets presented on the user interface for further analysis.
Figure 7D:
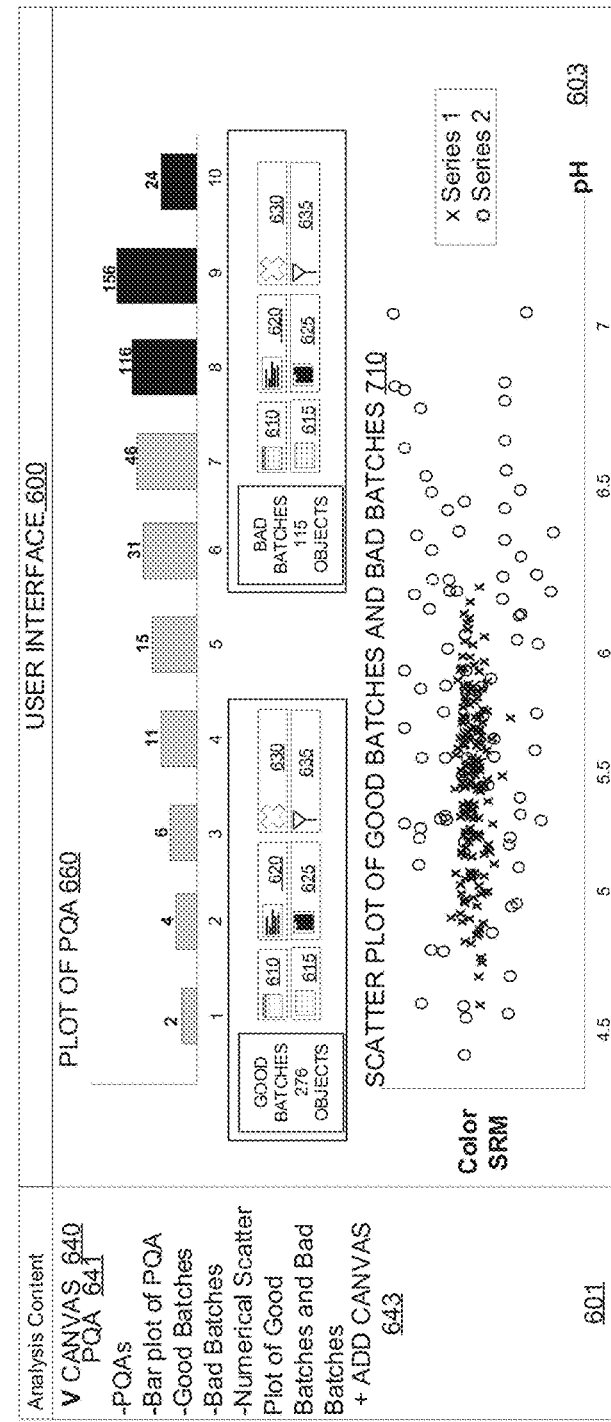
FIG. 7D illustrates a new first subset of PQA data objects and a new second subset of PQA data objects, the new subsets resulting from a different selection of data to include in each of the subsets (e.g., GOOD BATCHES and BAD BATCHES) from the previous subsets, and a corresponding scatter plot of time-series data of the two new subsets presented on the user interface, the scatter plat being automatically updated when the upstream selection of the data to include in each subset took place.

FIG. 7A illustrates the user interface 600 displaying on the canvas panel 603 an arrangement of the plot of the PQA's 660 and the two subsets of data objects, the Good PQA's having 180 data objects, and the Bad PQA's having 231 data objects. The analysis content panel 601 displays information indicating what is currently being shown in the canvas panel 603. While the arrangement of information on the canvas panel 603 is one example of displaying a first set of data objects and two subsets of data objects that are derived from the first set of objects, many other arrangements are also possible, a few are illustrated in FIGS. 7B, 7C, and 7D. Also, the functionality described above relating to drilling down into a first set of data objects (e.g., PQA's) to define subsets of the first set of data objects (e.g., Good PQA's and Bad PQA's) can be iteratively repeated to further define subsets, and subsets of those subsets, drilling down into the information using the object centric methodology described herein and the tools for generating plots, filtering the sets of data objects, and determining objects linked to the set of data objects.

In an example, to analyze the data sets of the Good PQA's and the Bad PQA's, a user can user the linked object tool 630 on each set of data objects to determine data objects that are linked to that set of data objects which may be helpful for analysis. The object-centric methodology allows a user to navigate through the linked objects of a data set. The linked object tool 630 can be applied iteratively to identify objects linked to a first set of data object, an identified object can be selected to designate another set of data objects, and then the linked object tool can be applied again to identify objects linked to the designated set of data objects. This allows a user to quickly and easily traverse through a set of data objects to identify related data objects that may be useful for further analysis. As described in reference to FIG. 8 (e.g., linked object set 825 and linked objects set 830 on graph 800) the operations of determining linked object sets is tracked by the system and can be displayed in a visualization on a user interface to provide a user an overview (or roadmap) of the analysis that has been performed, including identifying linked object sets that have been identified.

For example, by selecting the linked object tool 630 on the tool palette corresponding to the set of Good PQA data objects, the system can determine all of the objects linked to the set of Good PQA data objects. In this example as illustrated in FIG. 7B, the linked object tool 630 identified a data set Good Batches having 180 data objects, each one of the Good Batches being associated with a corresponding data object in the set of Good PQA data objects, and these are displayed graphically in the user interface as the set of Good Batches data objects. Similarly, the linked object tool 630 identified a data set Bad Batches having 231 data objects, each one of the Bad Batches being associated with a corresponding data object in the set of Bad PQA data objects, and these are displayed graphically in the user interface as the set of Bad Batches data objects. The analysis content panel 601 shows the contents of the canvas panel. For example, in FIG. 7B, the canvas panel 601 indicates the canvas panel 603 is displaying the Good PQA data objects, the Good Batches data objects, the Bad PQA's data objects, and the Bad Batches data objects. Because the object-centric functionality of the user interface provides for flexibility in the data analysis, at any point in the analysis additional operations can be performed on one or more of the defined sets of data objects, or one or more new sets of data objects can be defined. For example, additional plots of one or more of the defined data sets can be generated and displayed, the data sets can be filtered to create additional subsets of data sets, or additional linked objects can be determined for one of the defined sets of data objects. To provide clarity to a user of the operations that have been performed in the data analysis, the system is configured to, at any time, generate and display a graphical depiction of the operations performed in the analysis, an example of which is further described in reference to FIG. 8.

To compare the Good Batches to the Bad Batches and determine what may affect a batch to be deemed a Good Batch (linked to a PQA having a rating of "9" of "10") or a Bad Batch (linked to a PQA having a rating of less than "9"), for each of the Good Batches data set and the Bad Batches data set, the All Plots tool 625 can be selected to generate a scatter plot of each data set such that the data sets are overlaid they can be graphically compared. FIG. 7C illustrates on the analysis content panel 601 to display on the canvas panel 603 the Good Batches data set, the Bad Batches data set, and a numerical scatter Plot of the Good Batches and the Bad Batches data. A user input can be received by the system to select the information to be displayed on the X-axis and the Y-axis of the scatter plot. In this example, each of the good batches and bad batches is associated with data generated by sensors capturing data about the batches when they were produced, and this data can be displayed to provide insight on factors that may cause a batch to be a good batch or a bad batch. In this example, a user input indicated to plot, along the X-axis, the pH of each sample when the batch was complete and to plot, along the Y-axis, a color SRM of the batch when the batch was complete. The Good Batches are indicted by an "x" on the scatter plot, and the Bad Batches are indicated by an "o" on the scatter plot. Although FIG. 7C illustrates one example of a comparison plot that can be generated using linked sensor data, as one of skill in the art will appreciate, numerous other plots can be generated and displayed as well.

In the scatter plot of good batches and bad batches 710, it appears that the good batches (shown by "x") are in a pH range of about 4.7 to about 6.0 with a relatively similar color SRM, but it is a difficult to ascertain the bounds of the data set because the number of bad batches is greater than the number of good batches as previously defined by good batches having a rating of "9" or "10" and bad batches having a rating of "8" or lower. Because of the object-centric configuration of the system, a data analyst can easily redefine the criteria for the Good and Bad Batches to make a larger data set of the Good Bat so that they are easier to see on the scatter plot 710. For example, in the user interface 600, the user can provide an input to reselect the PQA ratings that define the good batches, adding the PQA rating of "8" such that the set of Good Batches data objects now includes any of the batches that have a rating of "8-10" and correspondingly, the set of Bad Batches data objects now includes any batches that have a rating of "7" or less. The selection by the user can be done similarly to what was done in reference to the selection illustrated in FIG. 6D, where the user graphically indicates the portion of a set of data objects to be included in a subset of data objects.

FIG. 7D illustrates the results of redefining the Good Batches to include the batches that have a rating of "8" or higher. Now the set of Good Batches data objects has been updated to include 276 objects, and the set of Bad Batches data objects has been updated to include 115 objects, as shown on the user interface 600. The plot of PQA's 660 has also been updated on the user interface 600 to indicate the selection of PQA's having a rating of "8-10." Further, the scatter plot of good batches and bad batches 710 has been updated to show the updated set of Good Batches data objects and the updated Bad Batches of data objects. Thus, this illustrates one example of a sequential analysis that is maintained, and where the user may edit the analysis at a point, causing automatic downstream updates of the rest of the sequential analysis. In this example, in the scatter plot 710 in FIG. 7D, as a result of redefining the set of Good and Bad Batches and the automatic update to the scatter plot 710, a pattern of the set of Good Batches of data objects can be more clearly seen. For example, the set of Good Batches of data objects fall within a narrow portion of the Color SRM measurements and generally between about 4.8 and 6.1 pH measurements. The set of Bad Batches of data objects are scattered from below a pH of 4.5 to a pH of 7.0, and the wide range of Color SRM. In this example, knowledge of what pH and Color SRM values indicate a batch being a Good Batch or a Bad Batch may be used for further analysis of the batches. For example, to analyze additional pH time-series data of individual batches while they are being generated to determine why the pH of some batches falls outside of the pH range of 4.8 to 6.1, or outside of the narrow Color SRM range shown on the scatter plot 710.

FIG. 8 illustrates an example of a graphical depiction ("Graph") 800 of the sequential object-centric analysis that is performed by the system during a data analysis flow. The functionality related to the Graph 800 provides the user with additional data analysis options for analyzing sets of data objects. For example, the system can generate and display (in response to user's input) the Graph 800 at any time during the data analysis. This can provide to the user a visual overview (or "data analysis roadmap") graphically illustrating the steps of the analysis that have been performed.

In addition to providing the user with a visualization of the sequential the object-centric flow of the current analysis, the displayed blocks (e.g., block 805, 810, 815, etc.) of the Graph 800 are selectable, and when selected, can take data analysis workflow to the portion of the sequential data analysis workflow to the user interface that corresponds to the operation indicated in the selected block, and the user can change the operation being performed or the data being used as desired starting from that point. If a workflow operation or the data being used is changed, the subsequent downstream workflow operations correspondingly change automatically. In addition, the Graph 800 is automatically updated with the operational change. Such operations can be iteratively repeated as many times as the user desires, and in any order that the user desires, and each time the downstream operations and data analysis results (e.g., plots, tables, lists, etc.) are correspondingly updated and the Graph 800 is also correspondingly updated.

In this example, Graph 800 corresponds to the data analysis operational workflow described above in reference to FIGS. 6A-E and FIGS. 7A-D. For example, block 805 of Graph 800 corresponds to the operations depicted in FIGS. 6A and 6B where a first set of data objects (PQA data objects) are selected for analysis. Block 810 corresponds to the operations depicted in FIG. 6C, where a bar plot of the set of PQA data objects is generated. Block 815 corresponds to operations depicted in FIG. 6D, where a subset of the set of PQA data objects are selected and designated as the Good PQA data objects. Block 820 corresponds to operations depicted in FIGS. 6E and 7A, where a derived object set is generated, the derived object set being Bad PQA data objects which is a subset of the PQA data objects, corresponding to the difference between all of the PQA data objects and the set of Good PQA data objects. Block 825 corresponds to operations depicted FIG. 7B where the linked object tool is used to define a linked object set of Good Batches of data objects that are associated with the Good PQA data objects. Similarly, block 830 also corresponds to operations depicted in FIG. 7B, where the linked object tool is used to define a linked object set of Bad Batches of data objects that are associated with the Bad PQA data objects. Block 835 corresponds to operations depicted in FIGS. 7C and 7D, which showed numerical scatter plots of the data objects in the Good Batches and Bad Batches.

Once a data analysis workflow having one or more operations has been defined for a first set of data objects, the system can perform the same workflow operations on a second set of data objects. As an example, as described in the example workflow in reference to FIGS. 7C and 7D, a first scatter plot of data objects in the Good Batches and Bad Batches is illustrated in FIG. 7C, it is determined that the data objects included in the set of Good PQA data objects should be increased to include ratings of "8" and higher, and the set of Bad PQA data objects, the set of Good Batches data objects, and the set of Bad Batches data objects are correspondingly and automatically changed, as well as the scatter plot 710. The user of the Graph 800 functionality can facilitate such operations. For example, once the user decides to change the set of Good PQA data objects to include PQA ratings of "8" and above, wherever the user is in the workflow, a user can display the Graph 800 and select block 815 which takes them back to the corresponding user interface (e.g., as illustrated in FIG. 6D) such that they can make the desired selection of PQA's to include in as Good PQA's, and all of the subsequent processing automatically occurs to generate the scatter plot illustrated in FIG. 7.

For processing efficiency, the system keeps track of data generation operations, or "calls" that the system makes to a storage system or backend processing system to determine a set of data objects from stored information, and keeps track of the data determined by these calls (e.g., the set of data objects that result from these calls). When possible, when subsequent data retrieval calls are made, if the system has previously made a data retrieval call that encompasses the new data retrieval call, the system uses information from the previous call to determine the data set provided for the new data retrieval call thus eliminating, when possible, additional backend calls. In other words, operations depicted in the Graph 800 do not require another backend call if selected for re-display/re-use.

Numerous variations of methods may be performed by the data analysis system described herein incorporating one or more aspects of the disclosed functionality. The method can be performed by a system that includes one or more non-transitory computer storage mediums, for example, the system described in reference to FIGS. 1 and 5. In one example, the method includes storing at least a plurality of sets of data objects including a first set of data objects and a second set of data objects, the data objects in the plurality of sets of data objects including links to other data objects. In some embodiments, each of the set of data objects include time-series and/or non-time series data. The system can have one or more computer hardware processors in communication with the one or more non-transitory computer storage mediums, the one or more computer hardware processors configured to execute the computer-executable instructions to perform the method. The method can further include presenting the plurality of sets of data objects in a selectable format on a display device of the system, receiving at the system a user selection of the first set of data objects, generating a user interface that includes a visualization of the first set of data objects and a plurality of selectable tools configured to select and present on the user interface aspects of the first set of objects. The method can further include receiving user selections of one or more of the tools to cause respective one or more operations to occur on the first set of data objects in an analysis session for the set of data objects, updating the user interface to comprise a first visualization based on the one or more operations performed on the first set of data objects in the analysis session, receiving a user selection of the second set of data objects, receiving a user selection to cause the application of the one or more operations to the second set of data objects, and updating the user interface to comprise a second visualization based on the one or more operations performed on the second set of data objects. In various embodiments, the method can include any of the additional function described herein.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A method for data analysis, the method comprising:
receiving, via a user interface, a first user selection of a first set of data objects of a plurality of sets of data objects;
updating the user interface to include an indication of the first set of data objects and an associated first plurality of selectable tools configured to select and present on the user interface aspects of the first set of data objects;
receiving a second user selection of one or more of the plurality of selectable tools to cause respective one or more operations to occur on the first set of data objects in an analysis session for the first set of data objects;
updating the user interface to include a first visualization based on the one or more operations performed on the first set of data objects in the analysis session;
responsive to a third user selection, received via the first visualization of the user interface, of a first subset of data objects of the first set of data objects, updating the user interface to include an indication of the first subset of data objects and an associated second plurality of selectable tools configured to select and present on the user interface aspects of the first subset of data objects;
responsive to a fourth user selection, received via the user interface:
  determining a second subset of data objects, wherein the second subset of data objects comprises a difference between the first set of data objects and the first subset of data objects and an associated third plurality of selectable tools configured to select and present on the user interface aspects of the second subset of data objects; and
  updating the user interface to include an indication of the second subset of data objects;
responsive to one or more fifth user selections to at least one of the second plurality of selectable tools or the third plurality of selectable tools, determine one or more linked sets of data objects based at least in part on links from data objects of at least one of the first or second subsets of data objects to data objects of another set of data objects, wherein the another set of data objects is different from the first set of data objects, the first subset of data objects, and the second subset of data objects; and
responsive to a sixth user selection, received via the user interface, updating the user interface to include a second visualization based on the one or more linked sets of data objects, wherein the method is performed by one or more computer hardware processors in communication with one or more non-transitory computer storage mediums, the one or more computer hardware processors configured to execute computer-executable instructions to perform the method.

2. The method of claim 1, further comprising:
storing the plurality of sets of data objects on the one or more non-transitory computer storage mediums.

3. The method of claim 1, wherein the plurality of selectable tools includes a tool configured to update the user interface to display one or more data objects linked to data objects in the first set of data objects.

4. The method of claim 1, further comprising:
generating and displaying on the user interface a graph depicting information on the one or more operations that have been performed on the first set of data objects, the graph including a plurality of nodes, each of the plurality of nodes representing a respective operation of the one or more operations that has been performed on the first set of data objects.

5. A system comprising:
one or more non-transitory computer storage mediums configured to store at least:
a plurality of sets of data objects including a first set of data objects and a second set of data objects, wherein data objects in the plurality of sets of data objects including links to other data objects; and
computer-executable instructions; and
one or more computer hardware processors in communication with the one or more non-transitory computer storage mediums, the one or more computer hardware processors configured to execute the computer-executable instructions to at least:
receive, via a user interface, a first user selection of a first set of data objects of the plurality of sets of data objects;
update the user interface to include an indication of the first set of data objects and an associated first plurality of selectable tools configured to select and present on the user interface aspects of the first set of data objects;
receive a second user selection of one or more of the plurality of selectable tools to cause respective one or more operations to occur on the first set of data objects in an analysis session for the first set of data objects;
update the user interface to include a first visualization based on the one or more operations performed on the first set of data objects in the analysis session;
responsive to a third user selection, received via the first visualization of the user interface, of a first subset of data objects of the first set of data objects, update the user interface to include an indication of the first subset of data objects and an associated second plurality of selectable tools configured to select and present on the user interface aspects of the first subset of data objects;
responsive to a fourth user selection, received via the user interface:
determine a second subset of data objects, wherein the second subset of data objects comprises a difference between the first set of data objects and the first subset of data objects; and
update the user interface to include an indication of the second subset of data objects and an associated third plurality of selectable tools configured to select and present on the user interface aspects of the second subset of data objects;
responsive to one or more fifth user selections to at least one of the second plurality of selectable tools or the third plurality of selectable tools, determine one or more linked sets of data objects based at least in part on links from among data objects of at least one of the first or second subsets of data objects to data objects of another set of data objects, wherein the another set of data objects is different from the first set of data objects, the first subset of data objects, and the second subset of data objects; and
responsive to a sixth user selection, received via the user interface, update the user interface to include a second visualization based on the one or more linked sets of data objects.

6. The system of claim 5, wherein each of the plurality of sets of data objects includes time-series data.

7. The system of claim 6, wherein the first visualization and the second visualization include time-series data, and wherein the one or more computer hardware processors are further configured to execute the computer-executable instructions to:
based on a user input, select a portion of displayed time-series data in the first visualization and the second visualization, generate a third visualization including one or more linked objects to the time-series data displayed in the first visualization and the second visualization.

8. The system of claim 5, wherein the plurality of selectable tools includes a tool configured to update the user interface to display one or more data objects linked to data objects in the first set of data objects.

9. The system of claim 5, wherein the plurality of selectable tools includes a tool configured to filter the first set of data objects, based on an input from a user, and update the user interface to display a filtered first set of data objects, the filtered first set of data objects having fewer data objects than the first set of data objects.

10. The system of claim 5, wherein the one or more computer hardware processors are further configured to execute the computer-executable instructions to:
generate and display on the user interface a graph depicting information on the one or more operations that have been performed on the first set of data objects, the graph including a plurality of nodes, each of the plurality of nodes representing a respective operation of the one or more operations that has been performed on the first set of data objects.

11. The system of claim 10, wherein each node of the graph includes information indicating any respective child node of said each node.

12. The system of claim 5, wherein the one or more computer hardware processors are further configured to execute the computer-executable instructions to:
receive a seventh user selection indicating a change of at least one data object of the first set of data objects to create a changed first set of data objects;
receive an eight user selection to cause an application of the one or more operations to the changed first set of data objects, the application of the one or more operations to the changed first set of data objects being same operations that were previously performed on the first set of data objects; and
update the user interface to comprise a third visualization based on the one or more operations performed on the changed first set of data objects.

13. The system of claim 11, wherein a user selection of a node of the graph causes a presentation of the user interface comprising a third visualization corresponding to operations indicted in the selected node.

14. The system of claim 13, wherein the one or more computer hardware processors are further configured to execute the computer-executable instructions to:
  receive a user input in the user interface causing an application of one or more new operations on the first set of data objects, and
  update downstream previously defined one or more operations on the first set of data objects based on the application of the new one or more operations.

15. The system of claim 14, wherein the one or more computer hardware processors are further configured to execute the computer-executable instructions to:
  generate and display on the user interface the graph depicting information in one or more nodes of the graph the new one or more operations performed on the first set of data objects.

16. The system of claim 5, wherein the one or more computer hardware processors are further configured to execute the computer-executable instructions to:
  generate the second visualization based on one of an intersection, a union, or a difference in the first subset of data objects and the second subset of data objects.

17. The system of claim 5, wherein the one or more computer hardware processors are further configured to execute the computer-executable instructions to:
  select, based on a user's input, a portion of a visualization of a set of data objects and drill down to display data objects related to the selected portion.

* * * * *

UNITED STATES PATENT AND TRADEMARK OFFICE
CERTIFICATE OF CORRECTION

Page 1 of 1

PATENT NO. : 12,353,678 B2
APPLICATION NO. : 17/031707
DATED : July 8, 2025
INVENTOR(S) : John McRaven It is certified that error appears in the above-identified patent and that said Letters Patent is hereby corrected as shown below:

In the Claims

In Column 38, Claim 5, Line 7, delete "from among data" and insert --from data--.

Signed and Sealed this
Twenty-sixth Day of August, 2025

Coke Morgan Stewart
*Acting Director of the United States Patent and Trademark Office*